US010804041B2

(12) United States Patent
Cheng et al.

(10) Patent No.: US 10,804,041 B2
(45) Date of Patent: Oct. 13, 2020

(54) ELECTROCHEMICAL DEVICES COMPRISING CARBON-BASED MATERIAL

(71) Applicant: University of Idaho, Moscow, ID (US)

(72) Inventors: I. Francis Cheng, Moscow, ID (US); Yuqun Xie, Wuhan (CN); Isaiah Gyan, Moscow, ID (US); Nolan Nicholas, Milford, MA (US); David N. McIlroy, Moscow, ID (US); Peter R. Griffiths, Odgen, UT (US)

(73) Assignee: University of Idaho, Moscow, ID (US)

( * ) Notice: Subject to any disclaimer, the term of this patent is extended or adjusted under 35 U.S.C. 154(b) by 679 days.

(21) Appl. No.: 15/432,604

(22) Filed: Feb. 14, 2017

(65) Prior Publication Data

US 2017/0169959 A1   Jun. 15, 2017

Related U.S. Application Data

(62) Division of application No. 14/166,717, filed on Jan. 28, 2014, now Pat. No. 9,691,556.
(Continued)

(51) Int. Cl.
*H01G 11/36* (2013.01)
*H01G 11/86* (2013.01)
(Continued)

(52) U.S. Cl.
CPC ........... *H01G 11/36* (2013.01); *C02F 1/4672* (2013.01); *C02F 1/46109* (2013.01);
(Continued)

(58) Field of Classification Search
CPC ........ H01G 11/36; H01G 11/74; H01G 11/68; H01G 11/28; H01G 11/86; H01M 4/133;
(Continued)

(56) References Cited

U.S. PATENT DOCUMENTS 7,442,358 B2   10/2008 Sano et al.
2005/0079119 A1   4/2005 Kawakami et al.
(Continued)

FOREIGN PATENT DOCUMENTS

WO   WO2011/017338   2/2011

OTHER PUBLICATIONS

Frackowiak et al., Carbon materials for the electrochemical storage of energy in capacitors, (2001), Carbon 39 , pp. 937-950.*
(Continued)

*Primary Examiner* — Arun S Phasge
(74) *Attorney, Agent, or Firm* — Klarquist Sparkman, LLP

(57) ABSTRACT

Disclosed herein are embodiments of an electrochemical device comprising graphene material made using embodiments of the method disclosed herein. Also disclosed is a graphene electrode comprising the graphene material made using embodiments of the method disclosed herein. The graphene material disclosed herein for use in the disclosed electrochemical devices has superior properties and activity compared to carbon-based materials known and used in the art. The disclosed graphene material can be used in multiple different technologies, such as water treatment, batteries, fuel cells, electrochemical sensors, solar cells, and ultracapacitors (both aqueous and non-aqueous).

20 Claims, 40 Drawing Sheets

Related U.S. Application Data

(60) Provisional application No. 61/757,411, filed on Jan. 28, 2013.

(51) Int. Cl.
  *H01G 11/28* (2013.01)
  *H01G 11/68* (2013.01)
  *H01M 4/133* (2010.01)
  *C02F 1/461* (2006.01)
  *C02F 1/467* (2006.01)
  *H01G 11/74* (2013.01)
  *B82Y 30/00* (2011.01)
  *C02F 101/30* (2006.01)

(52) U.S. Cl.
  CPC ............. *H01G 11/28* (2013.01); *H01G 11/68* (2013.01); *H01G 11/74* (2013.01); *H01G 11/86* (2013.01); *H01M 4/133* (2013.01); *B82Y 30/00* (2013.01); *C02F 2001/46133* (2013.01); *C02F 2101/30* (2013.01); *Y02E 60/13* (2013.01); *Y02P 70/54* (2015.11); *Y02W 10/37* (2015.05); *Y10S 977/948* (2013.01)

(58) Field of Classification Search
  CPC ........ Y02P 70/54; Y02W 10/37; B82Y 30/00; Y02E 60/13; C02F 2001/46133; C02F 1/4672; C02F 1/46109; C02F 2101/30; Y10S 977/948
  See application file for complete search history.

(56) References Cited

U.S. PATENT DOCUMENTS

| | | |
|---|---|---|
| 2006/0062713 A1 | 3/2006 | Sano et al. |
| 2006/0062715 A1 | 3/2006 | Endo et al. |
| 2006/0121279 A1 | 6/2006 | Petrik |
| 2007/0092432 A1 | 4/2007 | Prud'Homme et al. |
| 2009/0068471 A1 | 3/2009 | Choi et al. |
| 2009/0155561 A1 | 6/2009 | Choi et al. |
| 2012/0228555 A1 | 9/2012 | Cheng et al. |
| 2014/0111906 A1 | 4/2014 | Eilertsen |

OTHER PUBLICATIONS

Ji et al., Understanding the Physicoelectrochemical Properties of Carbon Nanotubes: Current State of the Art, Electroanalysis 2010, 22, No. 1, 7-19.*

Blyth et al., "XPS studies of graphite electrode materials for lithium ion batteries," *Applied Surface Science* 167:99-106, Jul. 2000.

Campos-Delgado et al., "Bulk Production of a New Form of $sp^2$ Carbon: Crystalline Graphene Nanoribbons," *Nano Letters* 8(9):2773-2778, Aug. 14, 2008.

Cheng "Guitar: A New Material for Dimensionally Stable Anodes," published online at http://www.webpages.uidaho.edu/ifcheng/recent_seminars_and_presentation.htm, May 2012.

Cheng "Guitar: A New Material for Dimensionally Stable Anodes," published online at http://www.webpages.uidaho.edu/ifcheng/recent_seminars_and_presentation.htm, Aug. 2012.

Cheng et al., "Highest Measured Anodic Stability in Aqueous Solutions: Graphenic Electrodes from the Thermolyzed Asphalt Reaction" *RSC Advances*, Dec. 6, 2012, 3(7), 2379-2384.

Cheng et al."Synthesis of Graphene Paper from Pyrolyzed Asphalt," *Carbon*, 49, 2852-2861, Mar. 12, 2011.

Estrade-Szwarckopf et al., "XPS photoemission in carbonaceous materials: A "defect" peak beside the graphite asymmetric peak," *Carbon* 42:1713-1721, Apr. 2004.

Xie et al. "Sulfur as an Important Co-factor in the formation of Multilayer Graphene in the Thermolyzed Asphalt Reaction," *Journal of Materials Chemistry*, 22, 5723-5729, Feb. 13, 2012.

International Search Report and Written Opinion dated Apr. 15, 2011, from International Application No. PCT/US2010/044269.

Written Opinion dated Apr. 15, 2011, from International Application No. PCT/US2010/044269.

* cited by examiner

Line analysis on 15 um image

ELECTROCHEMICAL DEVICES COMPRISING CARBON-BASED MATERIAL

CROSS REFERENCE TO RELATED APPLICATION

This is a divisional of co-pending U.S. patent application Ser. No. 14/166,717, filed Jan. 28, 2014, which claims the benefit of the earlier filing date of U.S. Provisional Patent Application No. 61/757,411, filed on Jan. 28, 2013, each of which is incorporated herein by reference in its entirety.

FIELD

The present disclosure concerns a method for making graphene and methods of using the same.

BACKGROUND

Graphene comprises a planar sheet of sp2-bonded carbon atoms, which are packed in a particular lattice formation. Methods for making graphene have been reported. Some reported methods include: (1) using a drawing method, whereby graphene is obtained by mechanical exfoliation of graphite; (2) epitaxial growth on metal substrates, whereby the atomic structure of a metal substrate is used to seed the growth of graphene; (3) hydrazine reduction, whereby graphene oxide paper is added to a solution of pure hydrazine, which reduces the graphene oxide to graphene; and (6) producing graphene ribbons from cutting open nanotubes. Currently, there are drawbacks with these methods, such as the high cost of large scale transformations, the small size of substrates used for epitaxial growth, and the time-consuming and delicate nature of the drawing method.

Despite the advances in graphene synthesis, there still exists a need for methods which can provide large scale production of graphene cost effectively.

SUMMARY

Disclosed herein are embodiments of an electrochemical device, comprising a positively charged electrode; a negatively charged electrode; a graphene layer comprising graphene having a substantially micro-crystalline grain size ranging from about 2 nm to about 15 nm, basal planes that are substantially planar, and a total electrochemical window of from at least about 3 V to about 5 V; and an electrolyte. In particular embodiments, the graphene layer covers at least a portion of the positive electrode, the negative electrode, or both. The electrochemical device can be connected to a power source. In some embodiments, the electrochemical device can be used to store energy or to provide energy. The graphene layer is capable of providing a capacitance ranging from at least 200 $\mu F/cm^2$ to about 700 $\mu F/cm^2$.

The graphene layer can be coupled to the positively charged electrode or the negatively charged electrode with an adhesive or a component that facilitates adhesion. In some embodiments, the adhesive is a synthetic polymer, an epoxy, or a combination thereof. Exemplary adhesives include, but are not limited to, silicone, bisphenol A epoxy resin, bisphenol F epoxy resin, a novolac epoxy resin, an aliphatic epoxy resin, a glycidylamine epoxy resin, or combinations thereof. In some embodiments, the component that facilitates adhesion is an organic solvent. Suitable organic solvents include, but are not limited to acetone, ethyl acetate, acetonitrile, methylene chloride, or combinations thereof.

The positively charged electrode or the negatively charged electrode can comprise a polymer, such as an organic polymer selected from polystyrene, polypropylene, polyvinyl chloride, polyethylene, or combinations thereof.

Also disclosed herein are embodiments of an aqueous ultracapacitor. Embodiments of the aqueous ultracapacitor can comprise at least one graphene electrode comprising a graphene material having a substantially micro-crystalline grain size ranging from about 2 nm to about 15 nm, basal planes that are substantially planar, and that exhibits an anodic potential of at least 2 volts to about 3 volts, and a capacitance ranging from at least 200 $\mu F/cm^2$ to about 700 $\mu F/cm^2$. The aqueous ultracapacitor can also comprise an aqueous electrolyte. In some embodiments, the aqueous ultracapacitor produces from about 500 $\mu J/cm^2$ to about 600 $\mu J/cm^2$ of stored energy.

The disclosed aqueous ultracapacitor can be symmetric or asymmetric. In some embodiments, the graphene material of the aqueous ultracapacitor is anodized. The capacitance of the graphene material can range from about 250 $\mu F/cm^2$ to about 675 $\mu F/cm^2$. Certain embodiments of the aqueous ultracapacitor have the graphene material coupled to a nanomaterial (e.g., nanosprings). Exemplary embodiments of the disclosed aqueous ultracapacitor can produce about 550 $\mu J/cm^2$ of stored energy.

Also disclosed herein are embodiments of a graphene anode and a method of making a graphene anode. The graphene anode can comprise a graphene layer comprising graphene having a substantially micro-crystalline grain size ranging from about 2 nm to about 15 nm, basal planes that are substantially planar, and exhibits an anodic potential of at least 2 volts to about 3 volts, and a support layer.

The method of making the graphene anode can comprise providing a substrate, depositing a graphene layer on the substrate, wherein the graphene layer comprising graphene having a substantially micro-crystalline grain size ranging from about 2.0 nm to about 15 nm, basal planes that are substantially planar, and exhibits an anodic potential of at least 2 volts to about 3 volts, exposing the graphene layer to a support layer comprising an adhesive or that has been exposed to a component that facilitates adhesion, and removing the substrate from the graphene layer.

In some embodiments, depositing the graphene layer on the substrate comprises manually depositing the graphene layer on the substrate or depositing the graphene layer on the substrate in situ. For example, manually deposition can comprise exposing the graphene material to the support layer comprising an adhesive. The adhesive substantially coats the support layer and thereby couples the graphene layer to the support layer. In some embodiments, the graphene layer can be exposed to the support layer after it has been exposed to the component that facilitates adhesion. The component that facilitates adhesion can then be removed from the support layer prior to exposing the graphene layer to the support layer.

Also disclosed herein is a method for water remediation. The method can comprise passing non-potable water between a graphene anode and a cathode, wherein the graphene anode comprises graphene having a substantially micro-crystalline grain size ranging from about 2.0 nm to about 15 nm, basal planes that are substantially planar, and exhibits an anodic potential of at least 2 volts to about 3 volts. The method further comprises applying electric current and isolating potable water. In some embodiments, the graphene anode and the cathode are provided in a cell comprising an inlet through which the non-potable water enters the cell, and an outlet through which the potable water exits the cell. The graphene anode is capable of decomposing one or more organic contaminants in the non-potable water. The electric current typically is provided by a power source.

The foregoing and other objects, features, and advantages of the invention will become more apparent from the following detailed description, which proceeds with reference to the accompanying figures.

DETAILED DESCRIPTION

I. Terms

Figure 1:
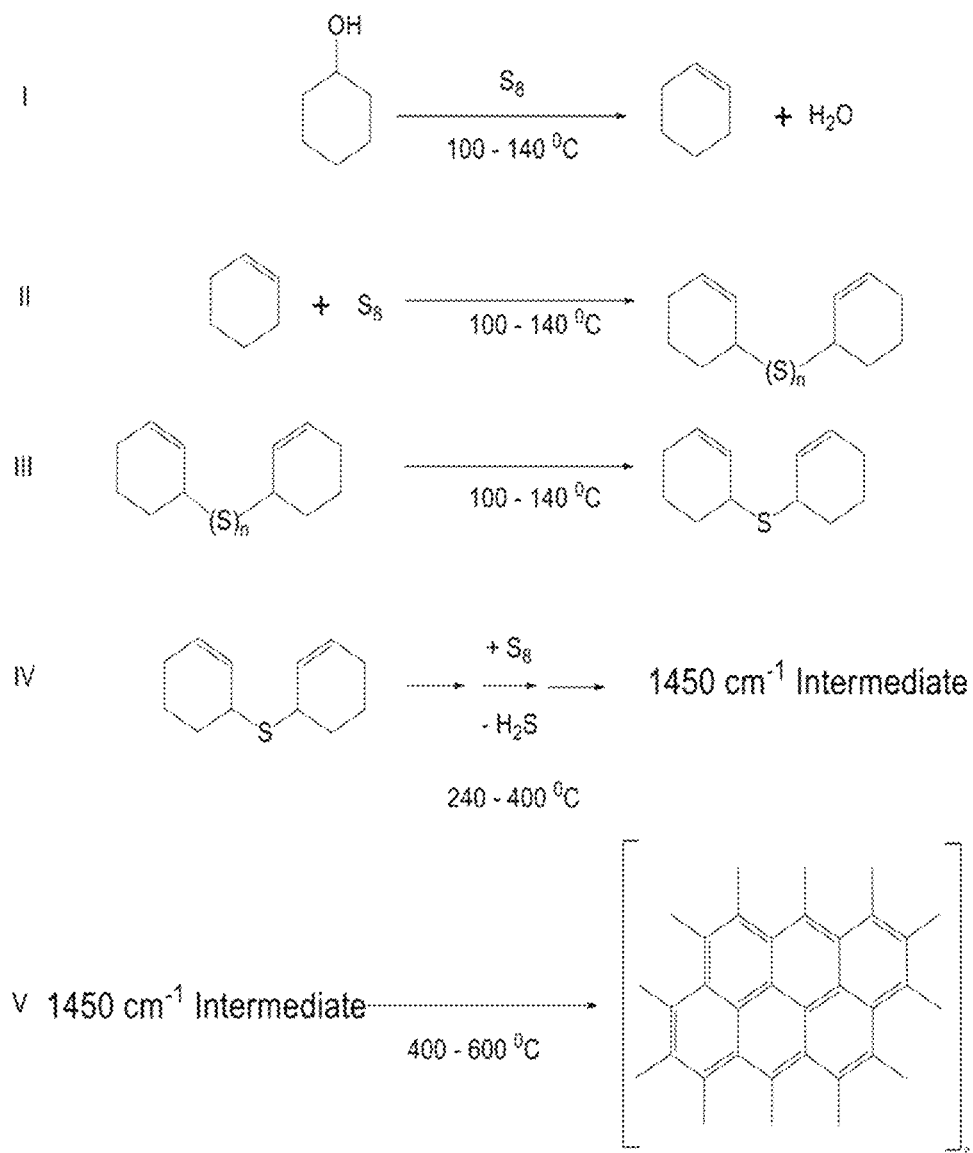
FIG. 1 is a schematic diagram of a current theory of operation for the disclosed method of making graphene.

Aliphatic: Any open or closed chain molecule, excluding aromatic compounds, containing only carbon and hydrogen atoms which are joined by single bonds (alkanes), double bonds (alkenes), or triple bonds (alkynes). This term encompasses substituted aliphatic compounds, saturated aliphatic compounds, and unsaturated aliphatic compounds.

Alkane: Chemical compounds comprising only of the elements carbon and hydrogen, wherein these atoms are linked together exclusively by single bonds (i.e., they are saturated compounds).

Aromatic: A term describing conjugated rings having unsaturated bonds, lone pairs, or empty orbitals, which exhibit a stabilization stronger than would be expected by the stabilization of conjugation alone. It can also be considered a manifestation of cyclic delocalization and of resonance.

Carbonaceous: The defining attribute of a substance rich in carbon. Carbonaceous hydrocarbons can be unsaturated, high-molecular-weight hydrocarbons, having an elevated carbon:hydrogen ratio, or saturated hydrocarbons.

Coatable material: A material that is capable of being covered with graphene using the disclosed method.

Cyclic: Designates a substantially hydrocarbon, closed-ring compound, or a radical thereof. Cyclic compounds or substituents also can include one or more sites of unsaturation, but does not include aromatic compounds. One example of such a cyclic compound is cyclopentadieneone.

Disulfide: A term used to describe compounds which are composed of a linked pair of sulfur atoms and which can be bound to other functional groups.

Functional Group: A specific group of atoms within a molecule that is responsible for the characteristic chemical reactions of those molecules. The same functional group will undergo the same or similar chemical reaction(s) regardless of the size of the molecule it is a part of. Examples include, but are not limited to, alcohols, alkenes, alkynes, thiols, disulfides, sulfides, sulfonyls, sulfoxides, and carbonyl groups.

Graphene: Individual layers of graphite in which each carbon atom is bonded to three other carbon atoms. Typically, "graphene" can be a planar sheet of sp2-bonded carbon atoms that are densely packed in a honeycomb crystal lattice. As used herein, "graphene" can be used to denote monolayered and/or multilayered forms of graphene.

Heteroaliphatic: An aliphatic group, which contains one or more atoms other than carbon and hydrogen, such as, but not limited to, oxygen, sulfur, nitrogen, phosphorus, chlorine, fluorine, bromine, iodine, and selenium.

Heterocycle: Cyclic compounds with at least two different elements as ring members atoms.

Hydrocarbon: An organic compound consisting entirely of carbon and hydrogen.

Isomeric: "Isomeric" is used to describe an isomer, which is a compound with the same molecular formula as another compound but with different a structural formula.

Precursor: A compound that participates in the chemical reaction that produces another compound.

Polycyclic: A cyclic compound with more than one ring structure. This term generally includes all aromatic and alkane hydrocarbons having more than one ring.

Sulfide: A moiety represented by the formula —SR, wherein R can be an alkyl group, optionally substituted with an alkenyl, alkynyl, aryl, arylakyl, cycloalkyl, halogenated alkyl, or heterocycloalkyl group as described above. The term sulfhydryl is used to refer to the formula —SR wherein R is H.

Thiol: A compound that contains the functional group composed of a sulfur-hydrogen bond (—SH). Being the sulfur analogue of an alcohol group (—OH), this functional group is referred to as either a thiol group or a sulfhydryl group. In the more traditional sense, thiols are often referred to as mercaptans.

Transition Metal: Any of the metallic elements within Groups 3 to 12 in the Periodic Table that have an incomplete inner electron shell and that serve as transitional links between the most and the least electropositive in a series of elements.

II. Introduction

Disclosed embodiments describe a method for making graphene using a carbonaceous starting material and sulfur, comprising heating the carbonaceous material and sulfur to a temperature and for a time effective to produce graphene. In particular embodiments, the carbonaceous starting material does not inherently comprise sulfur but is used in conjunction with a separate source of sulfur. In other embodiments, the carbonaceous starting material inherently comprises sulfur. The present disclosure is related to the subject matter disclosed in U.S. patent application Ser. No. 13/366,022, filed on Feb. 3, 2012, PCT/US2010/044269, filed on Aug. 3, 2010, U.S. Provisional Application No. 61/230,958, filed Aug. 3, 2009, U.S. Provisional Application No. 61/253,334, filed Oct. 20, 2009, and U.S. Provisional Application No. 61/259,734, filed Nov. 10, 2009. Each of these prior applications is incorporated herein by reference in its entirety.

U.S. Patent Publication No. 2006/0062715 discloses the formation of an ultra-thin carbon fiber having two or more graphene sheets layered using a mixture of raw material organic compound, iron, cobalt, molybdenum, ferrocene, or metal acetate, and sulfur (or thiophene or ferric sulfide) as a catalyst. This publication teaches the need for a transition metal and temperatures ranging from 800° C. to 1300° C., and/or temperatures ranging from 2400° C. to 3000° C. The presently disclosed method of making graphene, however, does not require a transition metal catalyst, nor does it require such high temperatures.

U.S. Pat. No. 7,442,358 discloses the formation of stacks of graphene sheets. One example included the use of toluene as a starting material, ferrocene as a primary catalyst, dodecanthiol as a co-catalyst and carbon dioxide as a medium. These components were reacted at 430° C. and a pressure of 25 MPa for three hours. The product was then calcined and used to make a lithium secondary battery. This patent requires a ferrocene catalyst; a feature that is not required in the presently disclosed method.

The carbonaceous starting material, which either contains sulfur or is used in conjunction with a separate source of sulfur, is added to a first container. The first container can be used alone, or can be placed inside a second container. The second container and/or first container holding the carbonaceous starting material and sulfur is then maintained under a partially or completely inert atmosphere by methods known to a person of ordinary skill in the art to include covering the system, placing the system under an atmosphere of inert gas, or placing the system under pressure. The system containing the starting materials is heated to a temperature effective to produce graphene using a heat source. Heating is carried out for a time effective to produce graphene, typically from about greater than 0 to about 60 minutes; more typically from about 2 minutes to about 20 minutes. In disclosed embodiments the reaction vessel, which contains the carbonaceous starting material and sulfur, is heated for a range of time from about 5 minutes to about 8 or 10 minutes. Certain embodiments employ a cooling period ranging in time from about greater than 0 to about 60 minutes, more typically from about 4 minutes to about 10 minutes. A person of ordinary skill in the art will understand that the temperature and time effective to produce graphene may depend on the amount of starting material used.

Embodiments of the current method can be used to at least partially or fully coat materials or devices containing surfaces capable of being coated with graphene. The graphene made using embodiments of the method disclosed herein also has particular properties that make it suitable for use in water treatment, batteries (e.g., for enhancing lead-acid batteries and/or for use in V redox flow batteries), fuel cells (e.g., as a conductive support for catalysts, as a catalyst when doped, and/or replacing current carbon nanotubes used in fuel cells), electrochemical sensors, solar cells, and ultracapacitors (both aqueous and non-aqueous). In particular embodiments, graphene made using embodiments of the method disclosed herein are used to make anodes that can be used in these types of applications.

III. Method for Making Graphene

A. Starting Materials

Certain embodiments disclosed herein utilize starting materials that can either inherently contain sulfur or only need be reacted with sulfur in order to form graphene. Working embodiments of the current method do not utilize a transition metal catalyst (or additive) (e.g. are essentially free of a transition metal catalyst) to form graphene. Starting materials that do not inherently contain sulfur can be utilized. These starting materials can be selected from carbonaceous materials, including, but not limited to, aliphatic hydrocarbons, aromatic hydrocarbons, substances that contain one or more of these classes of hydrocarbons, heteroaliphatic compounds, heteroaromatic compounds, and combinations thereof. Certain embodiments utilize saturated or unsaturated acyclic hydrocarbons, saturated or unsaturated cyclic hydrocarbons, saturated or unsaturated polycyclic hydrocarbons, and saturated or unsaturated oxygen-containing starting materials.

Examples of aliphatic hydrocarbons include any hydrocarbon known to a person of ordinary skill in the art to have a formula $C_nH_{2n+2}$. Particular embodiments use saturated, acyclic aliphatic hydrocarbons having 1 carbon atom to about 40 carbon atoms, more typically saturated, acyclic aliphatic hydrocarbons having from about 8 carbon atoms to about 40 carbon atoms. Certain embodiments employ starting materials comprising monocyclic hydrocarbons. These starting materials have a general formula $C_nH_{2n}$, and can have 3 carbon atoms to about 12 carbon atoms. Particular embodiments utilize monocyclic hydrocarbons having from about 3 carbon atoms to about 12 carbon atoms in a ring. A person of ordinary skill in the art will recognize that polycyclic hydrocarbons, as well as unsaturated acyclic, cyclic, and polycyclic hydrocarbons, can also be utilized in the current method.

Aromatic hydrocarbons can also be utilized as starting materials suitable for making graphene. Certain embodiments utilize monocyclic aromatic hydrocarbons, such as, but not limited to, benzene, toluene, and xylene. Particular embodiments utilize polycyclic aromatic hydrocarbons, including aromatic hydrocarbons having from about one aromatic ring to about 6 aromatic rings fused or linked together. Exemplary embodiments include naphthalene, anthracene, tetracene, fluoranthene, pyrene, and pentacene. In addition, isomeric polyaromatic hydrocarbons can be used in the disclosed method, such as phenanthrene and triphenylene.

Embodiments of the disclosed method also include using heteroaliphatic compounds. Particular embodiments utilize oxygen-containing carbonaceous materials. These carbonaceous materials can include acyclic and/or cyclic alcohols. Exemplary acyclic alcohols include compounds having from about 1 carbon atom and at least one oxygen atom to about 40 carbon atoms and at least one oxygen atom. Certain embodiments can employ monocyclic alcohols having 3 carbon atoms to about 12 carbon atoms. Particular embodiments utilize cyclic compounds having from about 3 carbon atoms and at least one oxygen atom to about 12 carbon atoms and at least one oxygen atom. A person of ordinary skill in the art will also recognize that polycyclic heteroaliphatic compounds can be used in the current method, as well as any unsaturated form of acyclic, cyclic, or polycyclic heteroaliphatic compounds. Exemplary embodiments disclose the use of cyclohexanol, phenol, ethyl alcohol, propanol (e.g. 2-propanol), and hexanol (e.g. 1-hexanol) as a starting material.

Starting materials that do not inherently contain sulfur can be used in the current method. Typically, embodiments utilizing starting materials that do not inherently contain sulfur require affirmative addition of sulfur. In other embodiments, starting materials inherently comprising sulfur are utilized. The forms of sulfur used in disclosed embodiments are discussed below.

B. Sulfur Reagents

Embodiments of the disclosed method utilize sulfur as a reagent for forming graphene. Sulfur can be independent from the carbonaceous material or the starting material can comprise sulfur. Particular embodiments that utilize the addition of sulfur to the carbonaceous material can utilize any form of sulfur known to a person of ordinary skill in the art to promote the conversion of the starting material to graphene. Exemplary embodiments utilize the addition of elemental sulfur, or a sulfur-containing material, such as dimethylsulfoxide (DMSO), and sulfosalicylic acid. A person of ordinary skill in the art will recognize that any sulfur-containing materials, such as thiols, sulfides, and disulfides can be employed in the current method. Exemplary embodiments concern using thiophenol and 1-octanethiol.

Other embodiments utilize carbonaceous materials that comprise sulfur. A person of ordinary skill in the art will recognize that a carbonaceous material comprising sulfur may not require the addition of a separate source of sulfur. These embodiments include tars containing carbonaceous materials and sulfur, such as tar from petroleum distillates. Particular embodiments utilize asphalt, bitumen, and kerogen. These starting materials inherently contain an amount of sulfur effective for producing graphene. Typically, these starting materials contain more than 0 percent to about 50 percent sulfur; even more typically, they contain from about 0.5 percent to about 5 percent sulfur.

Figure 2:
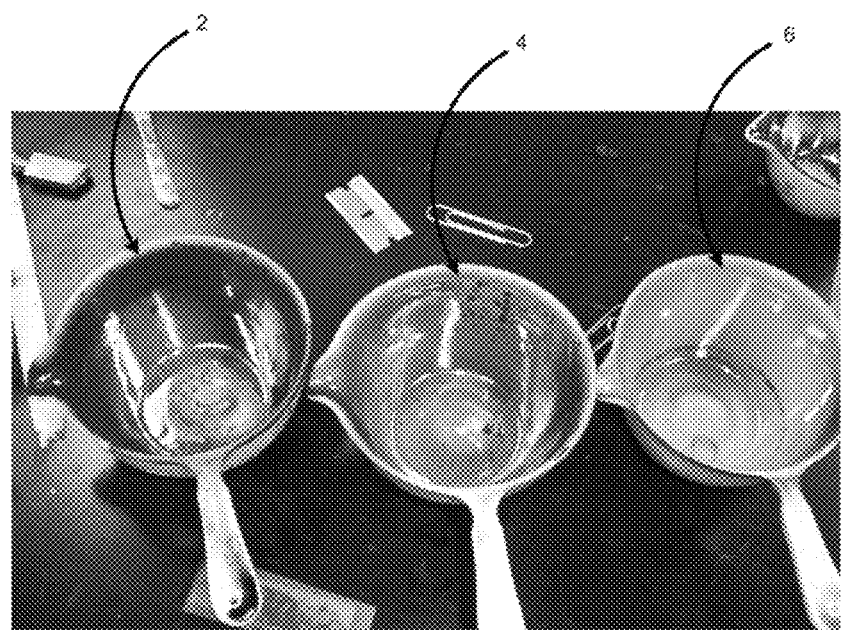
FIG. 2 is a digital image of the results from the current method utilizing paraffin and 3.5 grams (2), 2.0 grams (4), and 0.5 grams (6) of sulfur.
Figure 3:
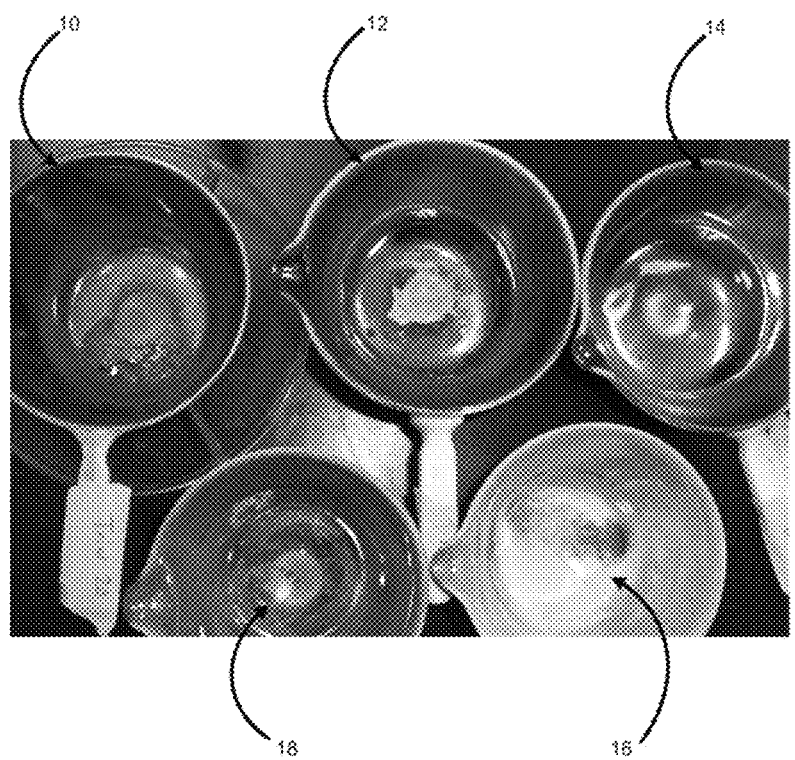
FIG. 3 is a digital image of the results from the current method utilizing motor oil and 5.0 grams (10), 2.0 grams (12), 1.0 grams (14), 0.10 grams (18) of sulfur, as well as no sulfur (16).
Figure 4:
FIG. 4 is a digital image of the results from the current method utilizing mineral oil and with 5.0 grams (20), 2.0 grams (22), 1.0 grams (24), 0.10 grams (28) of sulfur, as well as no sulfur (26).
Figure 5:
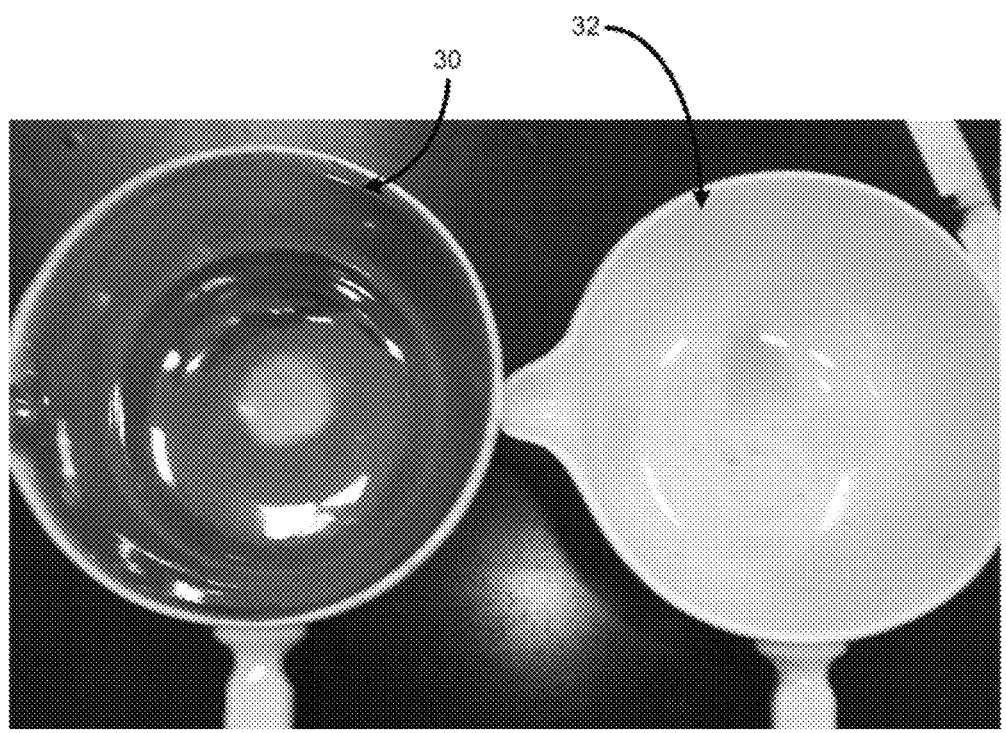
FIG. 5 is a digital image of the results from the current method utilizing cyclohexanol and 5.0 grams sulfur (30), as well as no sulfur (32).

Without being limited to a theory of operation, it is currently believed that the use of sulfur promotes the formation of graphene. FIG. 1 illustrates the proposed mechanism for graphene formation. With reference to FIG. 1, it is currently believed that sulfur may cause, either catalytically or stoichiometrically, the dehydration and/or dehydrogenation and crosslinking of the starting material at particular temperature ranges. In a particular disclosed embodiment, it is currently believed that sulfur reacts with the starting material, either an aliphatic compound or a hydroxyl-containing compound (e.g. an alcohol), to dehydrate or dehydrogenate the starting material to produce an alkene moiety. The sulfur can then react with the alkene to form polysulfide linkages, linking multiple alkene-containing moieties. Subsequent degradation and rearrangement then produces the desired grapheme product. Particular embodiments illustrate that increasing amounts of sulfur will contribute to increased amounts of graphene. Embodiments that do not employ the addition of sulfur or carbonaceous materials comprising sulfur do not result in detectable formation of graphene. A person of ordinary skill in the art will recognize that the amount of sulfur added depends on whether the sulfur is used catalytically or stoichiometrically. For example, graphene can be produced from heating the starting material in conjunction with sulfur and/or starting material comprising sulfur, wherein the amount of sulfur ranges from greater than 0 grams of sulfur to about 10 grams of sulfur. In particular embodiments, 0 grams of sulfur did not produce graphene, whereas 0.100 grams to about 5.00 grams of sulfur produced visible formation of graphene. FIGS. 2-5 illustrate graphene formed from the use of different starting materials and varying amounts of sulfur. FIG. 2 is a digital image of the results from the current method utilizing paraffin and 3.5 grams (2), 2.0 grams (4), and 0.5 grams (6) of sulfur, all of which provided detectable amounts of graphene. FIG. 3 is a digital image of the results from the current method utilizing motor oil and 5.0 grams (10), 2.0 grams (12), 1.0 grams (14), 0.10 grams (18) of sulfur, as well as no sulfur (16). The sample without sulfur did not produce detectable formation of graphene. FIG. 4 is a digital image of the results from the current method utilizing mineral oil and with 5.0 grams (20), 2.0 grams (22), 1.0 grams (24), 0.10 grams (28) of sulfur, as well as no sulfur (26). FIG. 5 is a digital image of the results from the current method utilizing cyclohexanol and 5.0 grams sulfur (30), as well as no sulfur (32). Again, the sample with no sulfur did not produce graphene. According to all of these embodiments, decreasing amounts of sulfur resulted in decreased formation of graphene.

The sulfur may promote the direct formation of graphene, or the sulfur may promote the formation of a reaction intermediate, which serves as a precursor to the formation of graphene. In certain embodiments, the starting materials were heated in the absence of oxygen (such as by heating in a closed system), whereby the reaction intermediate can be observed, typically as a tar-like substance. Upon further heating of the system, the reaction intermediate can coat the heated surfaces of the system, particularly the outer container, and after cooling, the graphene material can be detected and/or isolated. In other embodiments, the starting materials were heated in the presence of oxygen (such as by heating in a system open to air), whereby the reaction intermediate can be observed to dissipate into the atmosphere, resulting in no graphene formation. Without being limited to a theory of operation, it is currently believed that exposure of the reaction mixture to oxygen during heating will result in oxidation of the reaction intermediate, thereby preventing the ability of the reaction intermediate to be converted to graphene.

C. Graphene Formations

Particular embodiments utilize a method for forming graphene, comprising a starting material (or plurality of starting materials), typically comprising a carbonaceous material and an independent source of sulfur, an optional graphene-coatable material, and a reaction vessel comprising a first container, an optional second container, and a cover. In other embodiments, the method comprises a starting material, comprising a carbonaceous material that inherently contains sulfur, an optional graphene-coatable material, and a reaction vessel comprising a first container, an optional second container, and a cover.

Disclosed embodiments involve adding a starting material and sulfur, or a starting material comprising sulfur, to a first container. The addition of sulfur to the carbonaceous material can occur either before heating the reaction vessel, during heating of the reaction vessel, or after heating the reaction vessel, whereby the reaction vessel is heated again subsequent to the addition of sulfur. The reaction vessel can comprise a first container, which is heated, or it can comprise a first container that is placed inside an optional second container. Systems comprising an independent first container having a starting material and sulfur, or a starting material comprising sulfur, are sufficiently covered in a manner effective to substantially prevent exposure of the starting material and/or sulfur to an oxygen-rich atmosphere during the heating process. Certain embodiments utilize a system comprising a first container (containing a starting material and sulfur, or a starting material comprising sulfur) and a second container. The first container can be placed inside the second container and this system can be heated to a temperature and for a time effective to produce graphene, as disclosed above.

Figure 6:
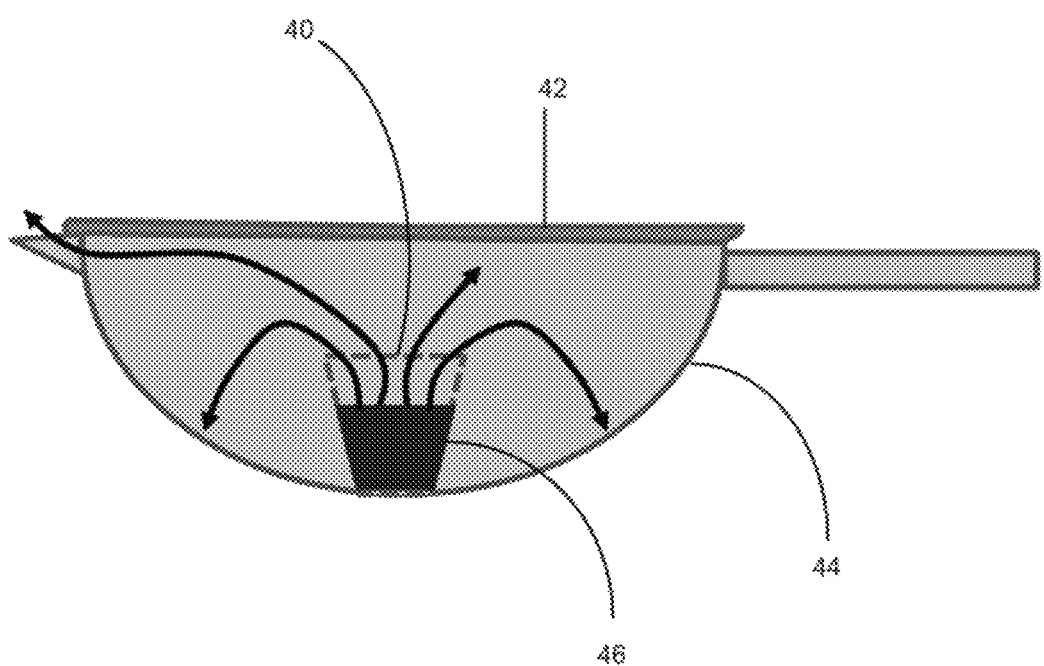
FIG. 6 is a diagram illustrating a closed system, which is utilized in particular embodiments of the disclosed method.
Figure 7:
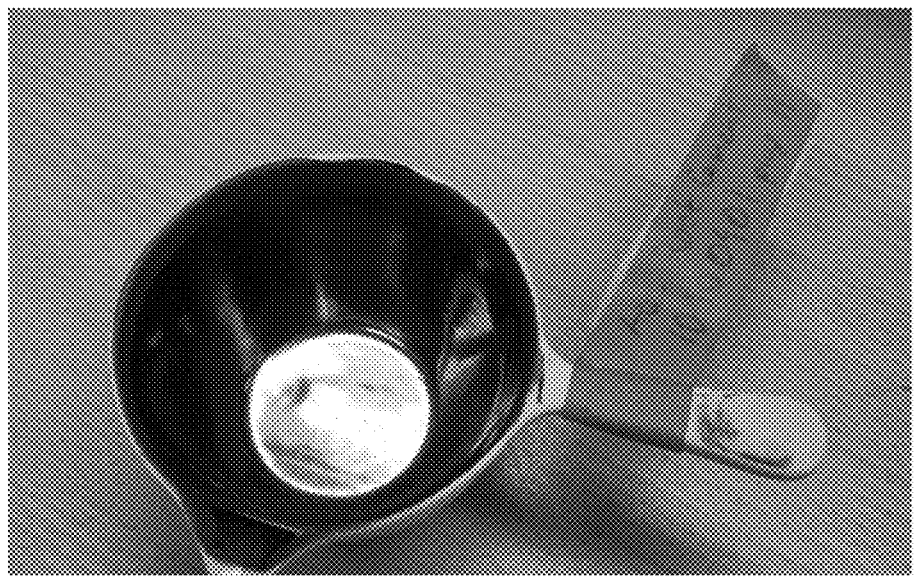
FIG. 7 is a digital image of an outer crucible containing graphene produced from roofing cement using an embodiment of the method disclosed herein.

FIG. 6 illustrates a system used in working embodiments in which a first container (40), containing the combined carbonaceous material and sulfur, has been placed inside a second container (44), which is then covered with a glass cover (42). FIG. 7 is a digital image of an outer container, particularly a crucible, after the formation of graphene has occurred. A person of ordinary skill in the art will understand, based on these working embodiments, that commercial embodiments useful for producing graphene would use a system that is capable of substantially excluding oxygen.

After the system is covered, it is heated to temperatures effective to form graphene. In particular embodiments, the heat source can be an open flame or any device capable of producing temperatures effective to form graphene. A temperature effective to produce graphene can range from about 250° C. to about 1200° C.; more typically, the temperature ranges from at least about 600° C. to about 1000° C. Certain disclosed embodiments concern using temperatures ranging from about 700° C. to about 1000° C.

The reaction vessel is heated for a time effective to produce graphene. A person of ordinary skill in the art will understand that the effective time may vary depending on the amounts of carbonaceous material and sulfur. In working embodiments, the time effective to form graphene ranges from greater than 0 to about 60 minutes. Certain embodiments are heated for about 5 minutes to about 20 minutes; more typically for about 5 minutes to about 10 minutes. A person of ordinary skill in the art will understand that, in commercial embodiments, the time ranges for producing graphene may depend on the amount of starting material. In particular embodiments, vapors are produced from within the first container when heat is applied to the reaction vessel, which can be observed to condense onto the outer container and/or ignite. Once the system has been heated to a temperature and for a time effective to produce graphene, it is allowed to cool. Cooling the system can comprise affirmatively reducing the temperature of the system using cooling methods known to a person of ordinary skill in the art, or cooling the system can comprise removing the heat source from the system whereby it equilibrates to the temperature of its surrounding environment.

Figure 8:
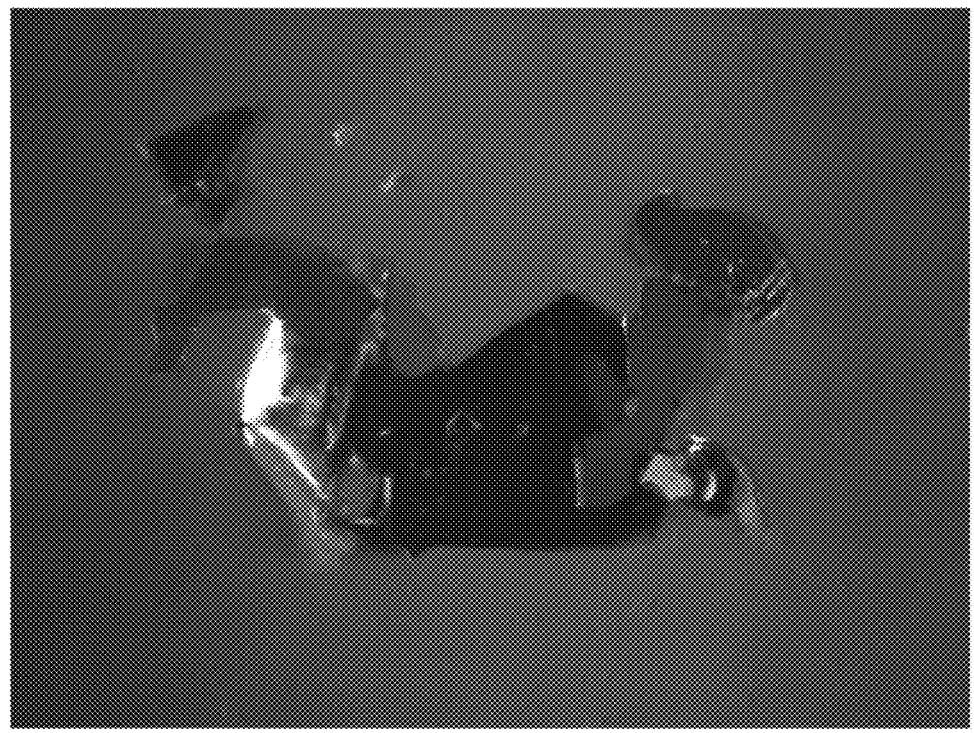
FIG. 8 is an optical image from a microscope illustrating an exfoliated sample of graphene made using a particular embodiment of the disclosed method.
Figure 9:
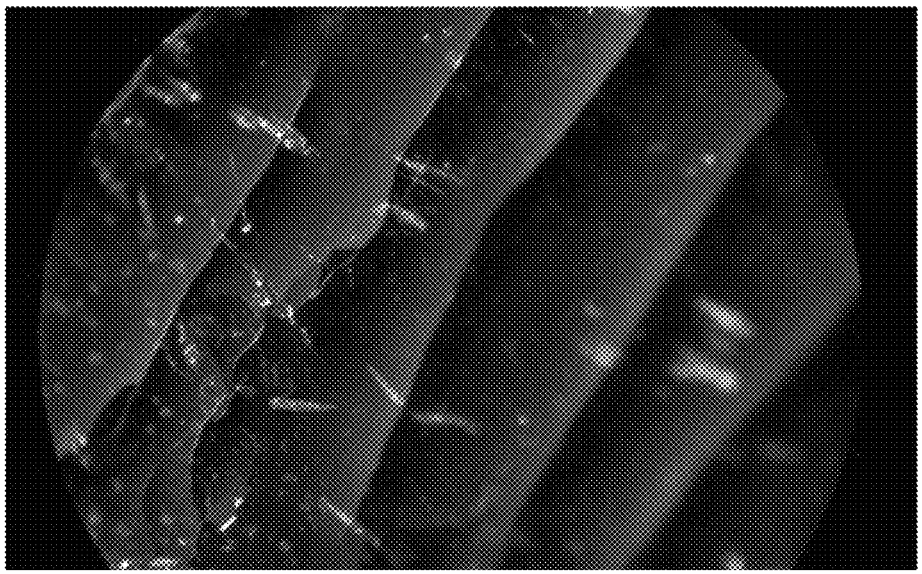
FIG. 9 is an optical image from a microscope of exfoliated graphene made using motor oil and 5.0 grams of sulfur.
Figure 10:
FIG. 10 is an optical image from a microscope of exfoliated flakes of graphene made using mineral oil and 3.5 grams of sulfur.

Particular embodiments produce graphene, which exhibits increased electrical conductivity and is impervious to acid, particularly sulfuric acid, perchloric acid, hydrochloric acid, and nitro-hydrochloric acid. FIGS. 8-10 illustrate exfoliated samples of graphene obtained using embodiments of the current method. FIG. 8 illustrates an exfoliated graphene sample. FIG. 9 is an image of exfoliated graphene obtained from a particular embodiment utilizing motor oil and 5.0 grams of sulfur. FIG. 10 is an image of exfoliated graphene obtained from a particular embodiment utilizing mineral oil and 3.5 grams of sulfur. Particular embodiments demonstrate the production of multilayered graphene, but a person of ordinary skill in the art will recognize that it may be possible to produce monolayered graphene utilizing the disclosed method and that the multilayered graphene can serve as a precursor to monolayered graphene.

Figure 11:
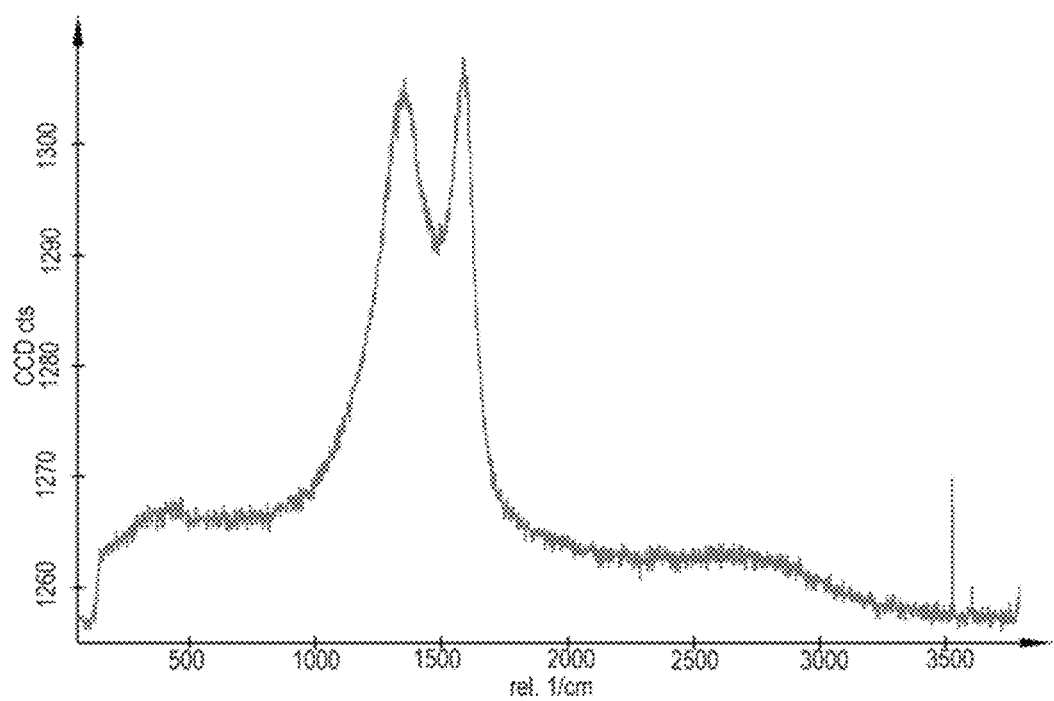
FIG. 11 is a spectrum obtained from Raman analysis of a graphene sample made using a particular embodiment of the disclosed method.

Graphene produced using the current method was analyzed using spectroscopy techniques, such as Raman spectroscopy, X-ray photoelectron spectroscopy (XPS), atomic force microscopy (AFM), scanning electron microscopy (SEM), and tunneling electron microscopy (TEM). One embodiment of the current method produced graphene having two observable and relatively broad peaks in the Raman peaks centered at 1593 $cm^{-1}$ and 1354 $cm^{-1}$ (FIG. 11). These two bands are located near to the typical G ($E_{2g}$) and D ($A_{1g}$) peaks, respectively. The G and D bands are associated with the ordered sp2 carbon, and disordered, defects and edge carbons, respectively. The wavenumber positions and relative peak intensities of the D and G bands (I(D)/I(G)=0.93) indicate that the carbon in this sample is nearly all sp2 in hybridization.

Figure 12:
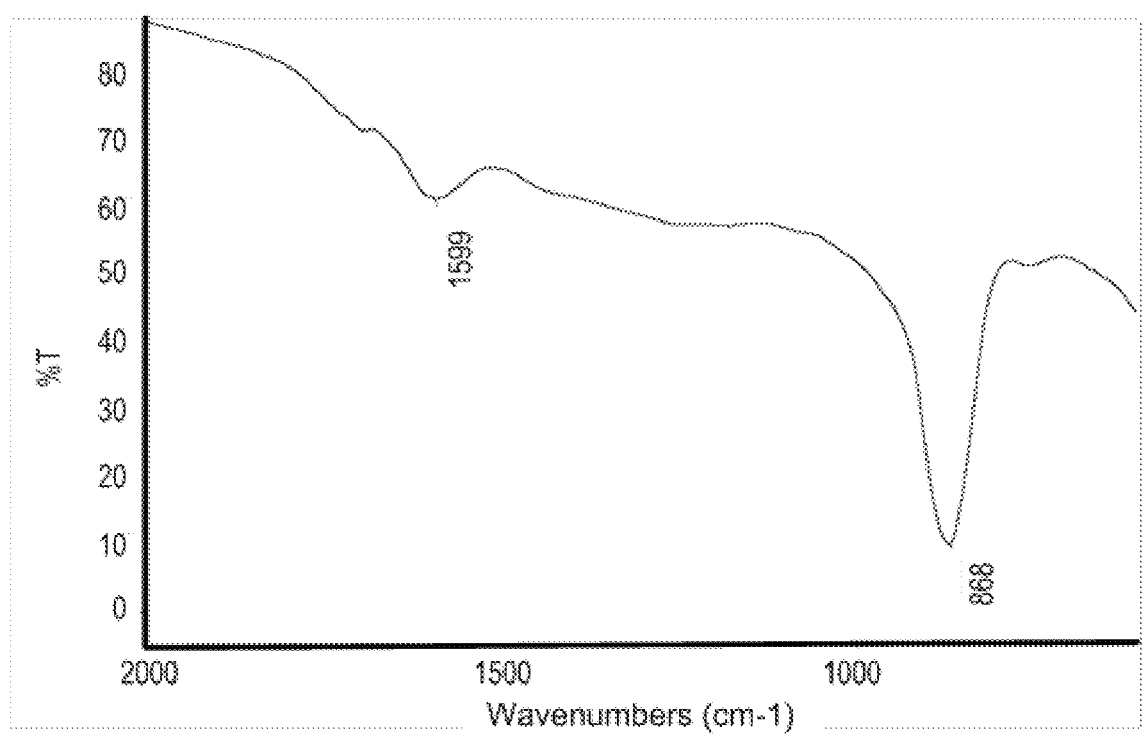
FIG. 12 is a spectrum obtained from Fourier transform-infrared spectroscopic analysis (FT-IR) of graphene on a germanium disk.

The IR analyses were conducted by depositing the graphene produced by working embodiments onto germanium. The spectrum appears in FIG. 12. Two bands appear at 868 and 1599 $cm^{-1}$. The position of these bands respectively matches those of the $A_{1U}$ out of plane and $E_{1U}$ stretch of the intralayer bonds of graphene. On the other hand, there are no peaks that match the expected positions for C—O or C=O stretches (1715-1740 and 1050 $cm^{-1}$). Based on the sum of the Raman and IR data, it can be concluded that the synthesized graphene is mostly carbon in the sp2 form, and that oxides are not the predominate form of this particular embodiment.

Figure 13:
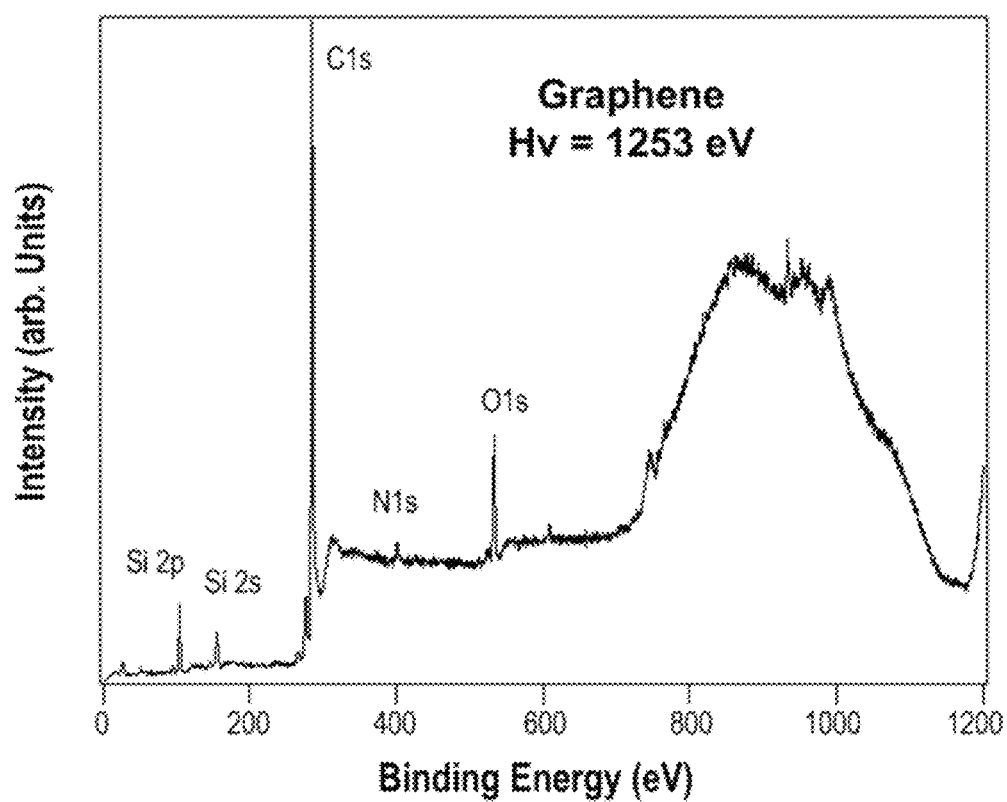
FIG. 13 is a spectrum obtained from x-ray photoelectron spectroscopic (XPS) analysis of a graphene sample made using a particular embodiment of the disclosed method.
Figure 14:
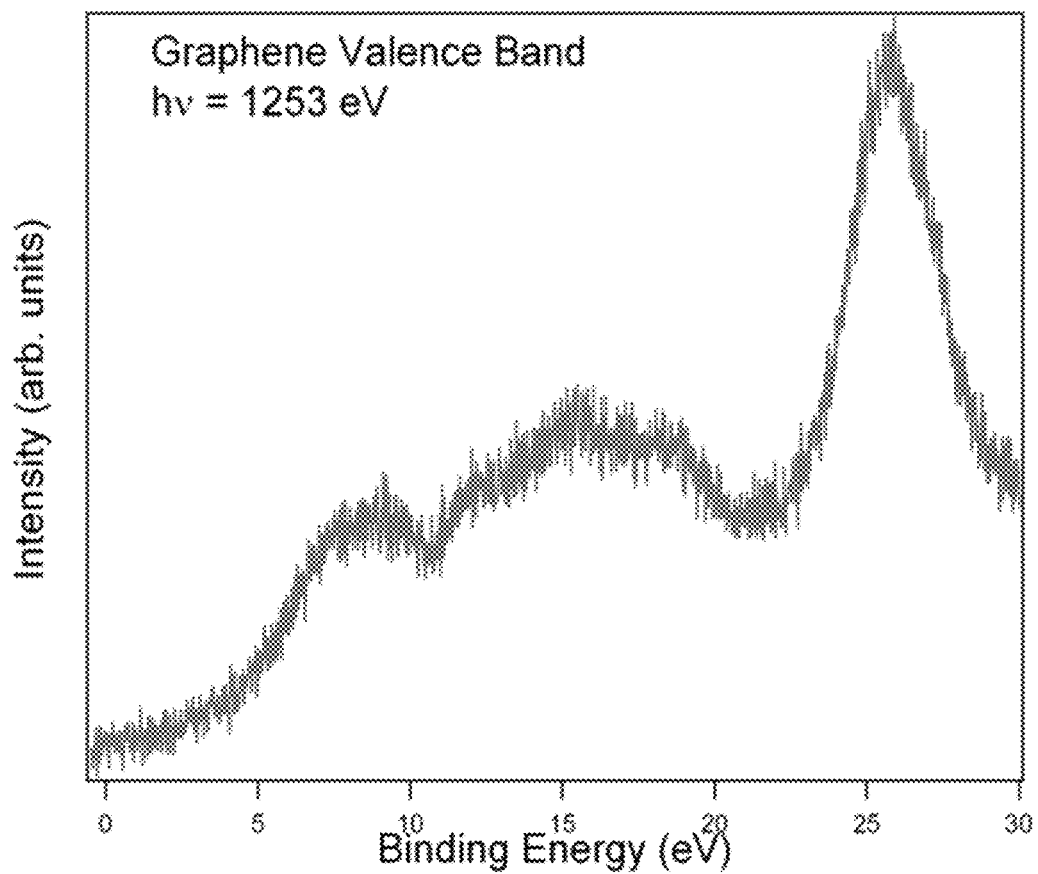
FIG. 14 is a spectrum obtained from x-ray photoelectron spectroscopic (XPS) analysis of a graphene sample made using a particular embodiment of the disclosed method, illustrating the valence band region.

XPS can be used to determine the elemental composition of graphene produced using the current method. Wide XPS scan (FIG. 13) reveals peaks that correspond to carbon (C) is (284.2 eV); the oxygen (O) is (533.3 eV); the silicon (Si) 2p (103.7 eV); the silicon (Si) 2s (155.6 eV) and the nitrogen (N) is (401.2 eV). Given that the samples were cleaved in the air prior to insertion into the vacuum chamber, it is difficult to ascertain if the O 1s peak is due to adsorbed $H_2O$, CO, or $CO_2$. In order to resolve the origin of the O 1s peak (i.e. in situ incorporation, or ex situ adsorption) the sample was annealed to 800° C. in vacuum. No change in the binding energy or intensity of the O 1s core level state was observed, indicating that the presence of the O 1s peak is due to in situ incorporation into the graphene films. The presence of broad features between 5 eV and 20 eV in the valence band spectrum (FIG. 14) is attributed to semi-metallic graphite, as opposed to diamond where these features are much more pronounced. However, in the case of graphene, XPS of the valence band alone is not sufficient for evaluating the metallic of the samples. The large peak at 25.5 eV is unassigned. However, Schafer et al (*Matter.* 1996, 53, 7762) have suggested that the appearance of oxygen on the surface of graphene results when the O 2p state mixes with the graphene valence band resulting in a feature around a binding energy of 26 eV. This assignment appears to be consistent with the present study when taken in conjunction with the observation of oxygen incorporated into the graphene film.

Figure 15:
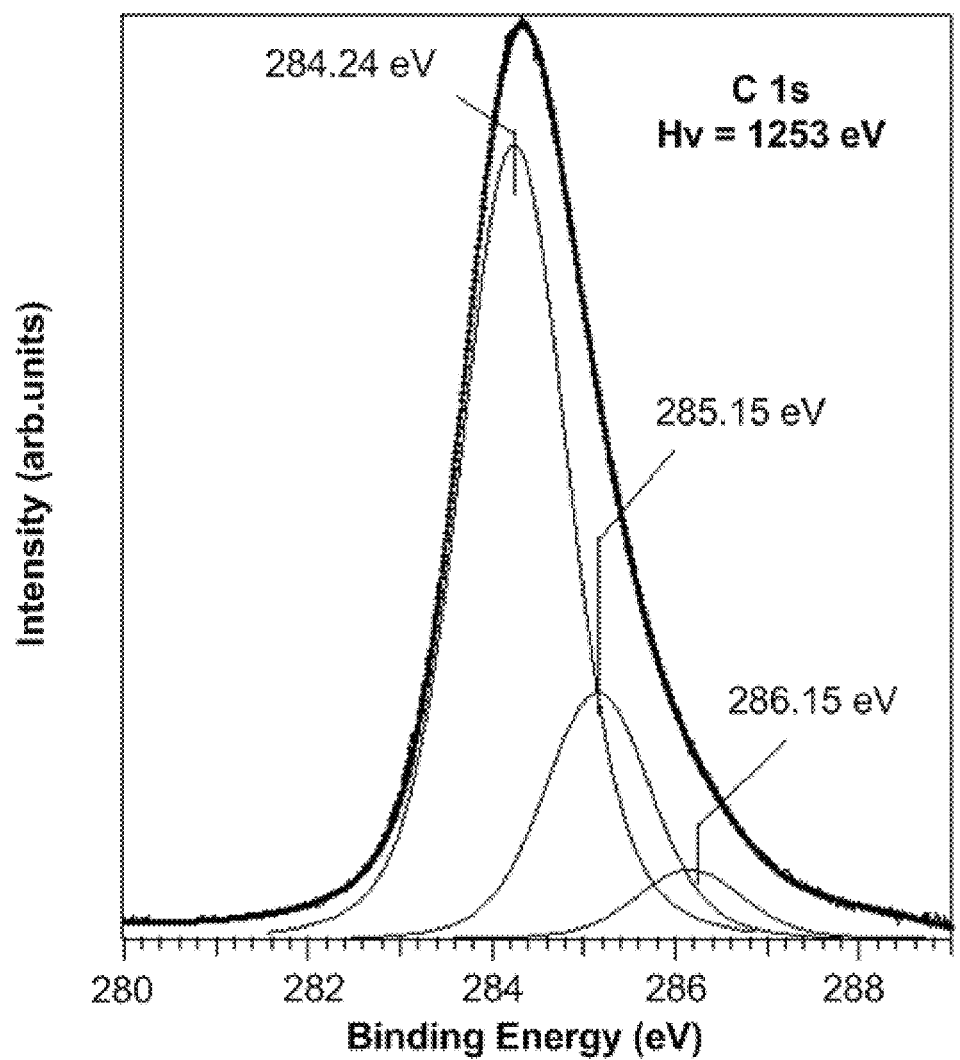
FIG. 15 is a XPS spectrum of the C 1s core level state of graphene.

FIG. 15 illustrates three deconvolved peaks of 284.2, 285.2 and 286.2 eV. The 284.2 eV peak agrees well with literature regarding the sp2 hybridized carbon-carbon bond, such as findings by Estrade-Szwarckopf (*Carbon*. 2004, 42, 1713), Yu et. al. (*Nano Lett*. 2009, 9, 1752), and Winter et. al. (*Appl Surf Sci*. 2000, 167, 99). The peak at 285.2 eV holds two possibilities: C—H sp3, as has been noted with graphite; or C=N sp2, as has been suggested for nitrogen doped graphene and carbon nanotubes. The latter is of consideration based on the appearance of the N 1s peak (401.2 eV) in the wide scan XPS of FIG. 13. The 286.2 eV peak is associated with C—O sp3, or other forms of C=N sp2. These assignments are summarized in Table 1.

TABLE 1

| XPS Peak | Possible Assignment |
|---|---|
| 284.2 eV | C=C, sp2 |
| 285.2 eV | C—H sp3 or C=N sp2 |
| 286.2 eV | C—OH, C—O—C, or C=N sp2 |

Figure 16:
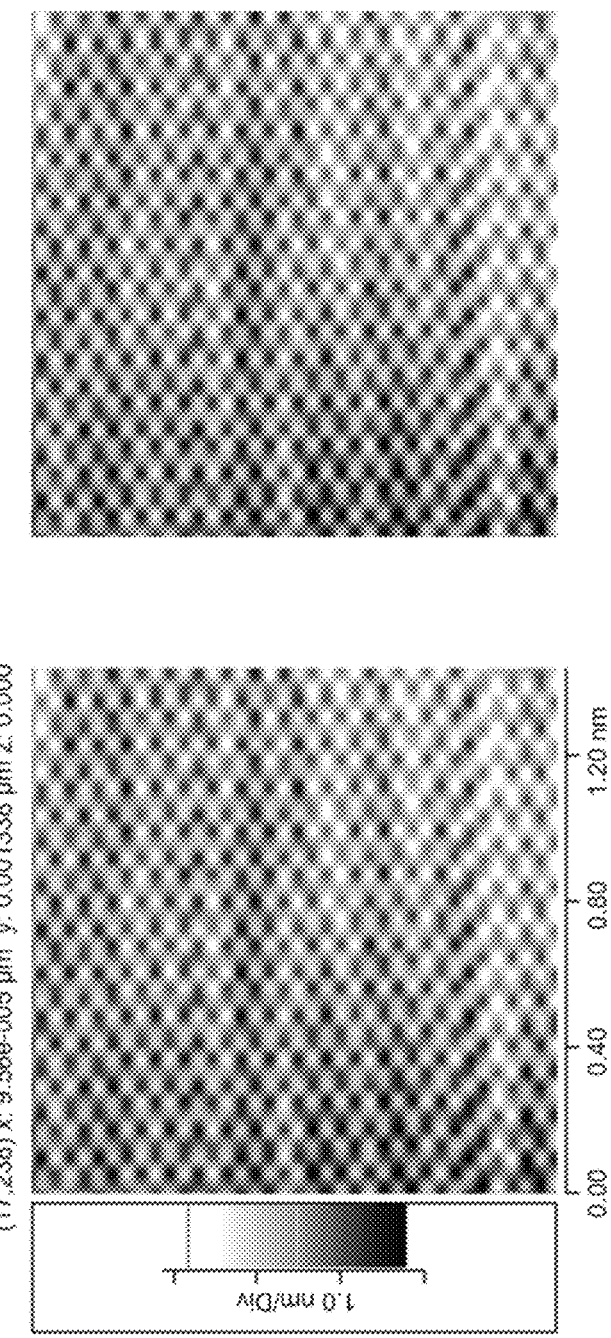
FIG. 16 is a 2-dimensional image illustrating the atomic structure of graphene made by the current method.
Figure 17:
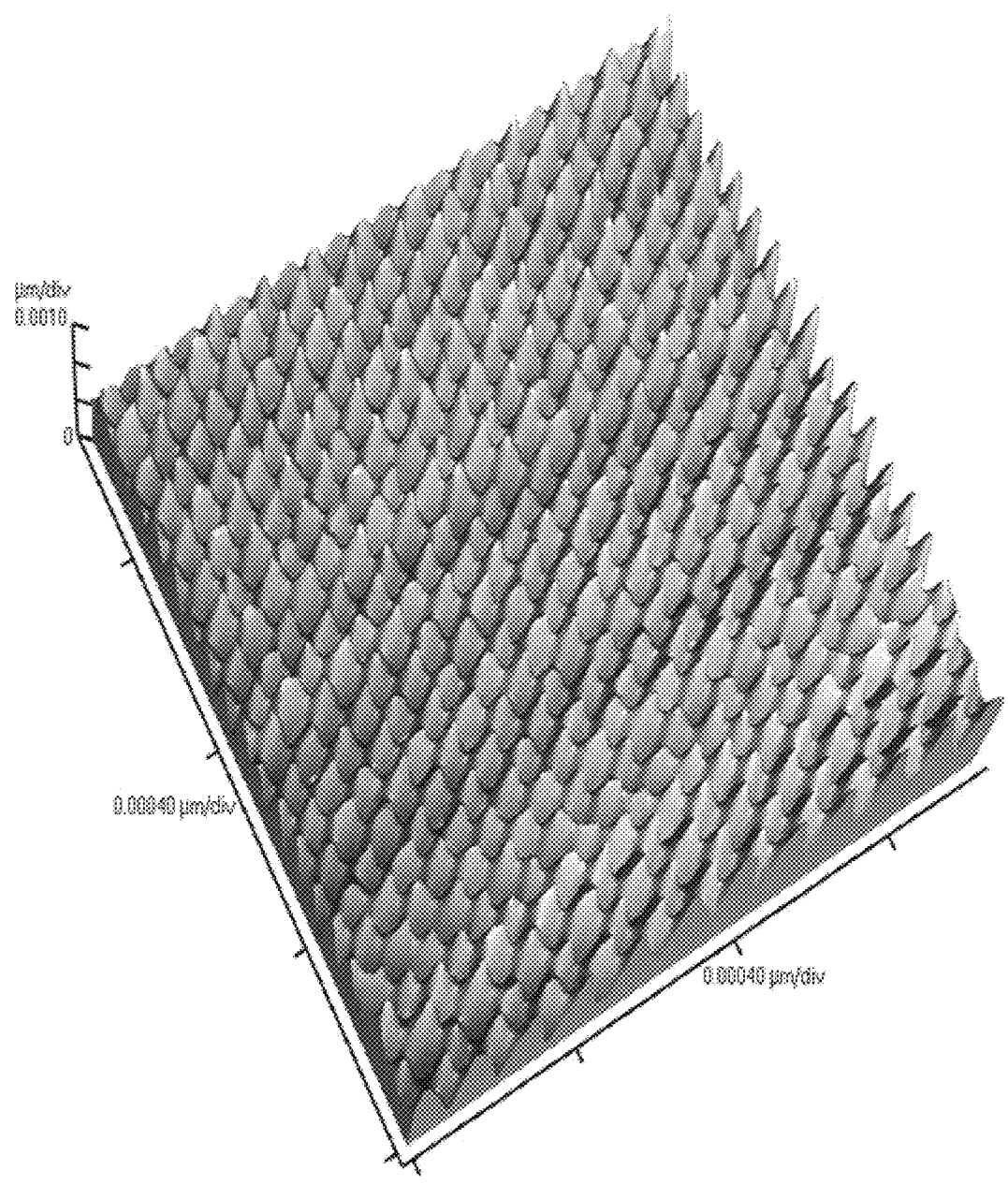
FIG. 17 is a micrograph (0.7×0.7 nm 3D) of graphene obtained from a particular embodiment of the current method.
Figure 18:
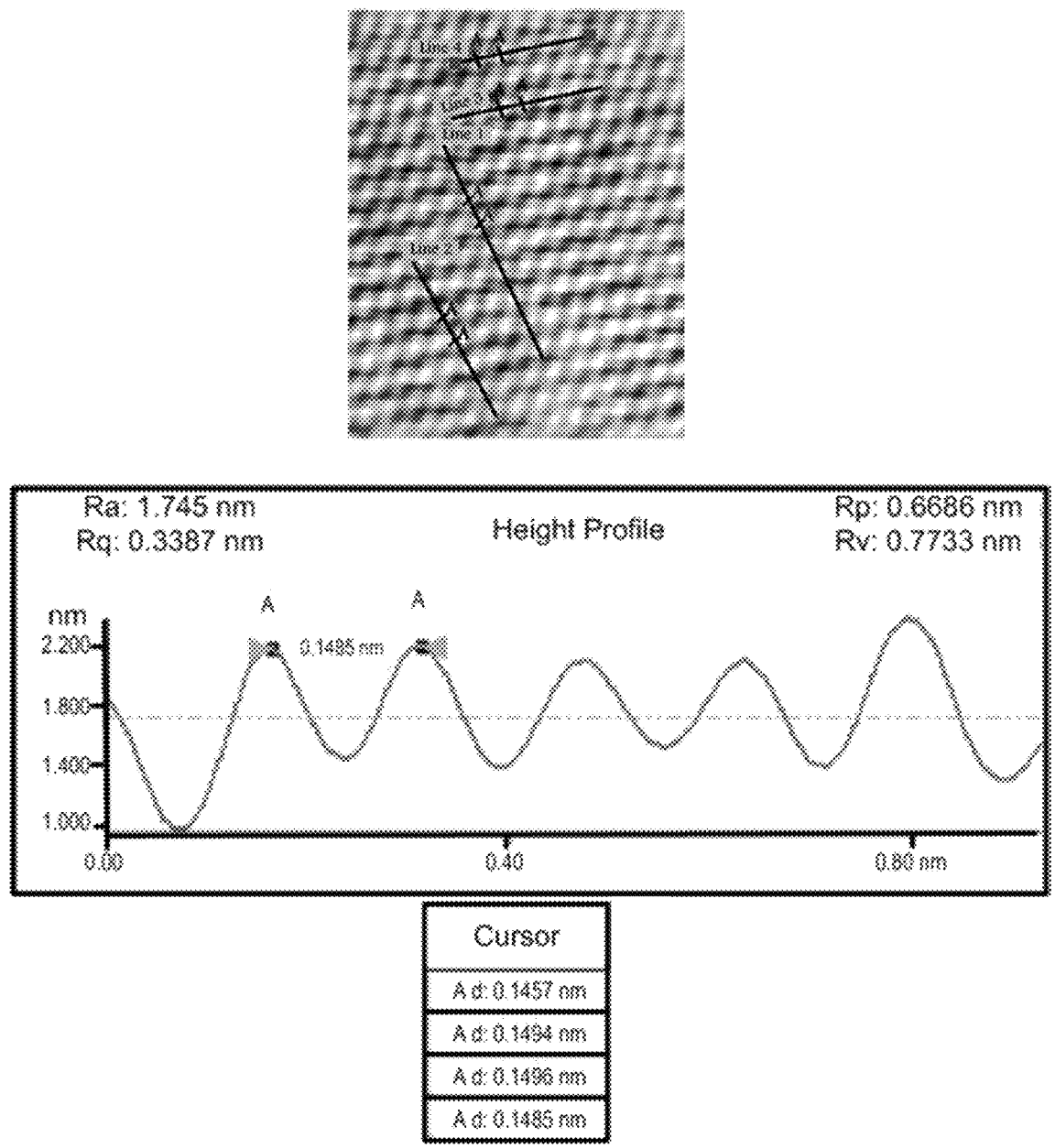
FIG. 18 is an image illustrating line analysis of topography showing the periodicity of atomic structure of graphene.

AFM can also be used to illustrate that particular embodiments of the current method produce graphene. AFM images, obtained in contact mode under ambient conditions, show the sample topography in 2 dimensions (FIG. 16) and 3 dimensions (FIG. 17). The images illustrate the expected hexagonal lattice and interatomic C—C distance (0.148 Angstroms) of graphene. The interatomic C—C distance was obtained from line analysis (comprising a scanning area of 2.2 nm×2.2 nm and a scan speed of 15 Hz), results of which are shown in FIG. 18. Additional embodiments are illustrated in FIGS. 34-37.

Care was taken to ensure that anomalous effects did not alter the atomic force micrographs. These effects include repulsive force associated between the tip and the sample of approximately 1-5 nN. Generally, under ambient conditions the surface is covered by one or more layers of absorbed water and other low molecular weight airborne contaminants leading to substantial capillary forces pulling the probe towards the sample with pressures of the order of GPa. Also, there is often an appearance of atomic structure without attaining true atomic resolution for materials of planar anisotropy such as HOPG and mica, where the molecular layers are known to translocate in a corrugated fashion moving in registry with the AFM tip. Imaging can further be complicated by the electrostatic forces between the tip and sample. Atomic repeat structures in the graphene layer were obtained by minimizing the tip force with a softer probe of high resonant frequency operating at a low setpoint. As the analysis was performed in air, the image is dominated by the topmost atomic layers.

Figure 19:
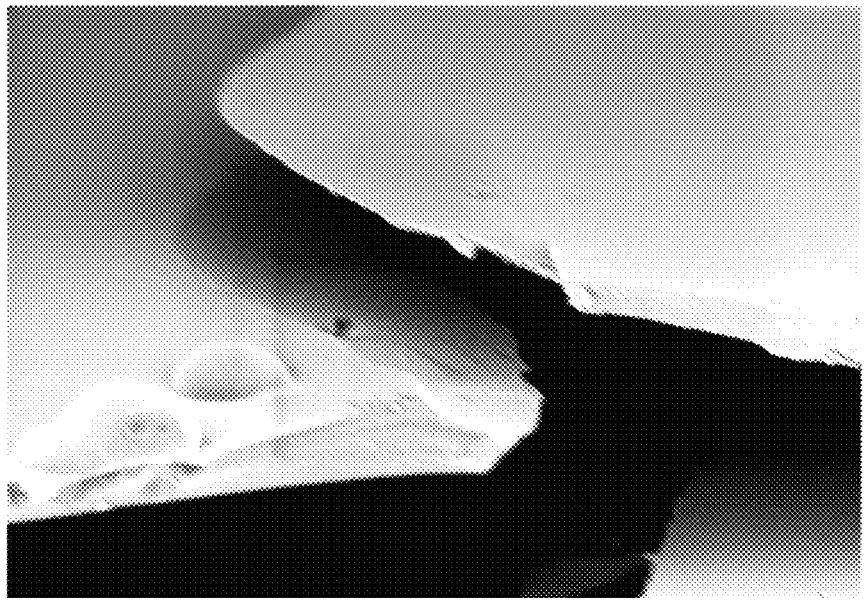
FIG. 19 is an image produced by a scanning electron microscope (SEM) illustrating graphene flakes made using a particular embodiment of the disclosed method.
Figure 20:
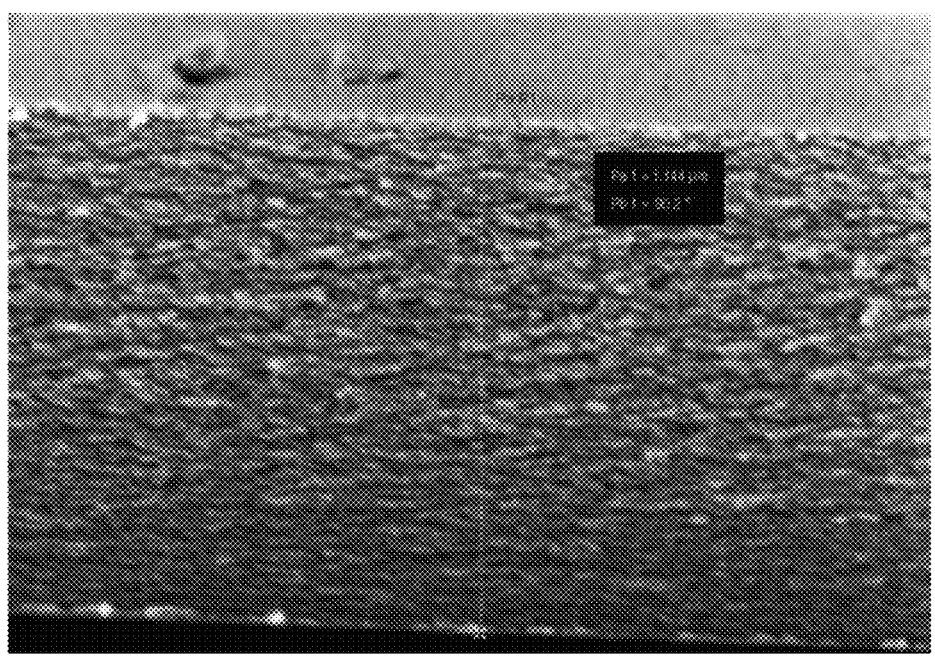
FIG. 20 is an image produced by a scanning electron microscope (SEM) illustrating an edge of graphene made using a particular embodiment of the disclosed method.
Figure 21:
FIG. 21 is a digital image illustrating an approximately 25 mm diameter graphene flake made using a particular embodiment of the disclosed method.
Figure 22:
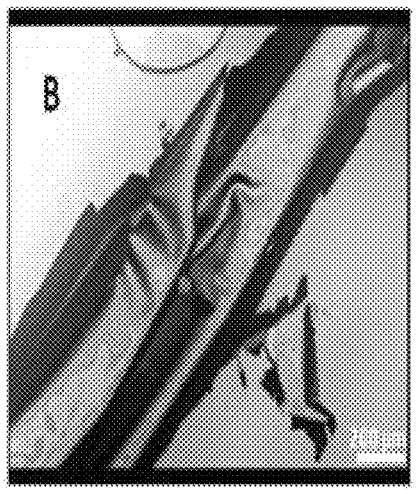
FIG. 22 is an optical micrograph (400×) illustrating the disclosed graphene material in water.
Figure 23:
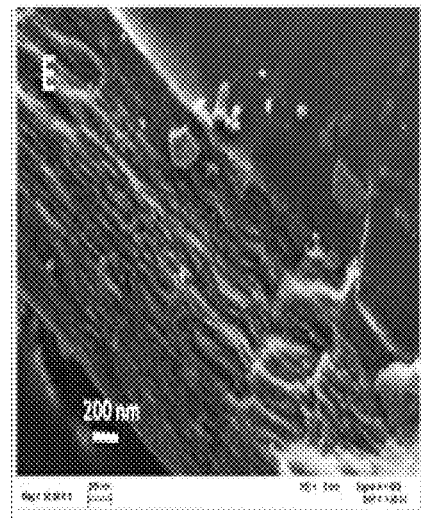
FIG. 23 is an optical micrograph (400×) illustrating graphene layers of an embodiment of the disclosed graphene material.
Figure 24:
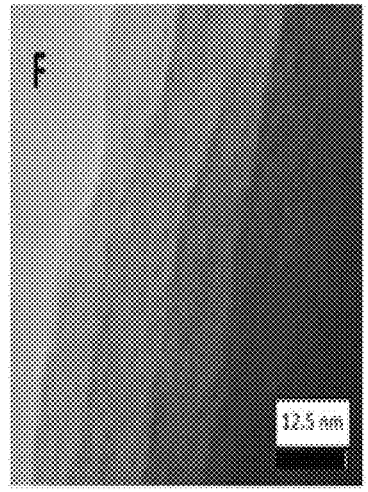
FIG. 24 is a TEM image showing layered characteristics of an embodiment of the disclosed graphene material on a nanometer scale.
Figure 33:
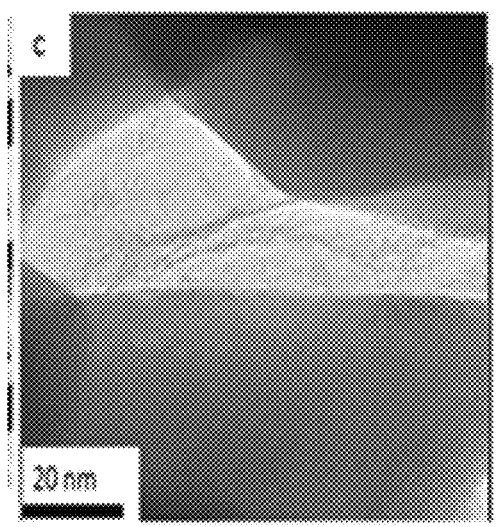
FIG. 33 is a TEM image of graphene film, illustrating layers.
Figure 34:
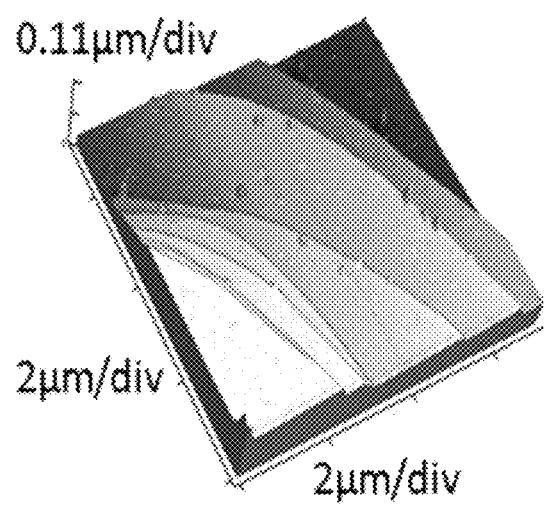
FIG. 34 is a 3-dimensional AFM image of graphene.

FIG. 19 is a SEM image of graphene flakes obtained using particular embodiments of the current method. FIG. 20 is a SEM image of the edge of a graphene sample produced by working embodiments, illustrating its layered characteristics (also illustrated in FIG. 33). A particular embodiment of a graphene flake produced using the current method, and its relative size, is illustrated in FIG. 21. Additional images illustrating some of the physical characteristics of the disclosed graphene material are provided in FIGS. 22, 23, and 24.

Figure 25:
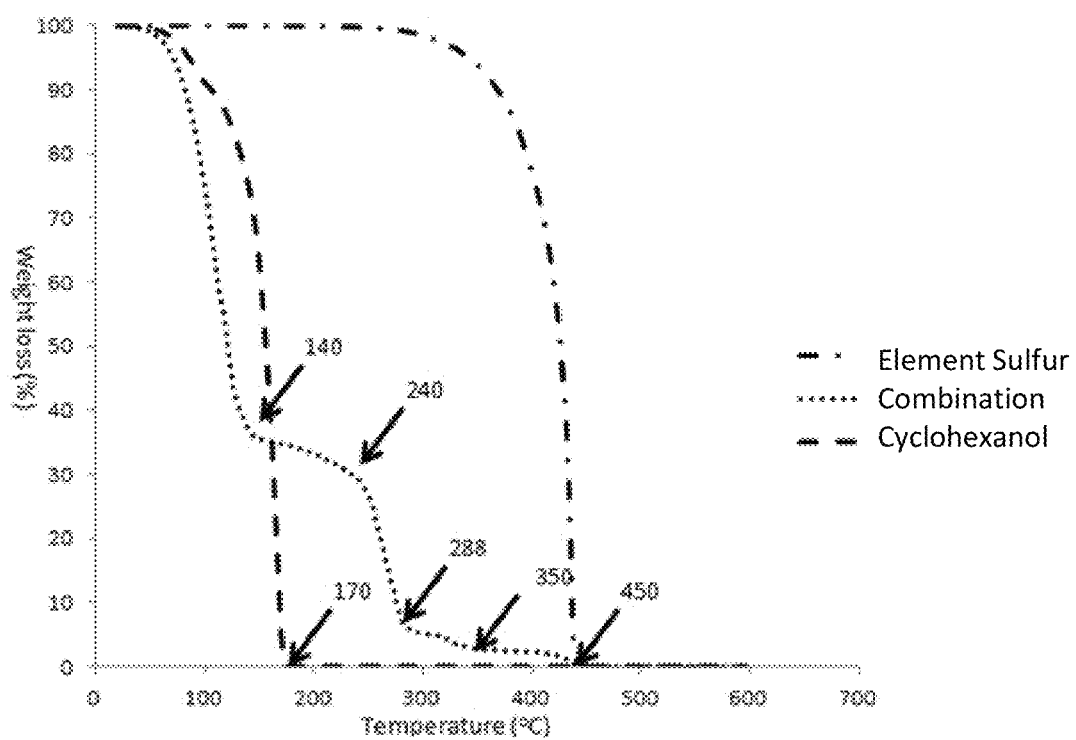
FIG. 25 is a thermogram of percent weight loss (Y-axis) versus temperature in degrees Celsius (X-axis).

In other disclosed embodiments, thermo gravimetric analysis (TGA) may be used to determine the minimum temperature for graphene formation as well as detect possible reaction intermediates. In particular disclosed embodiments, TGA was carried out by starting the reaction at room temperature, and providing a temperature increase of approximately 10° C. per minute to a temperature maximum of approximately 800° C.; more typically about 700° C.; even more typically about 600° C. Particular substances, such as unreacted starting materials, typically evaporate at the boiling point of the substance. FIG. 25 is a TGA thermogram, which illustrates a particular disclosed embodiment wherein cyclohexanol, elemental sulfur, and a combination thereof is exposed to the disclosed temperature treatment. According to FIG. 25, the temperature at which each material is lost may be determined, and particular inflection points may result, which can indicate a sequence of reactions that occur during the process.

IV. Methods for Using Graphene

Disclosed herein are various embodiments of a method of using the graphene material made using the method disclosed herein. The chemical and physical properties of the graphene material made according to various embodiments of the method disclosed herein facilitate its application in these particular uses.

A. Graphene-Coated Substrates

Figure 26:
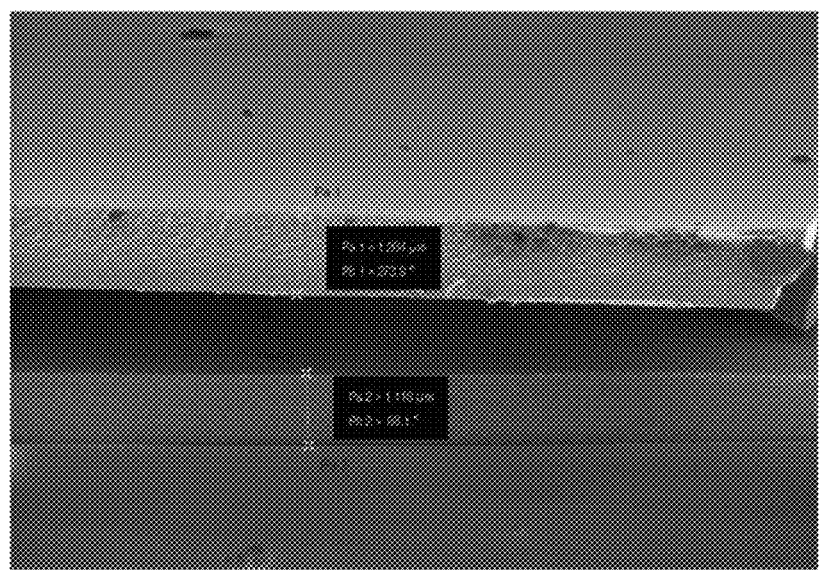
FIG. 26 is an image produced by a scanning electron microscope (SEM) illustrating layers of graphene made using a particular embodiment of the disclosed method.
Figure 27:
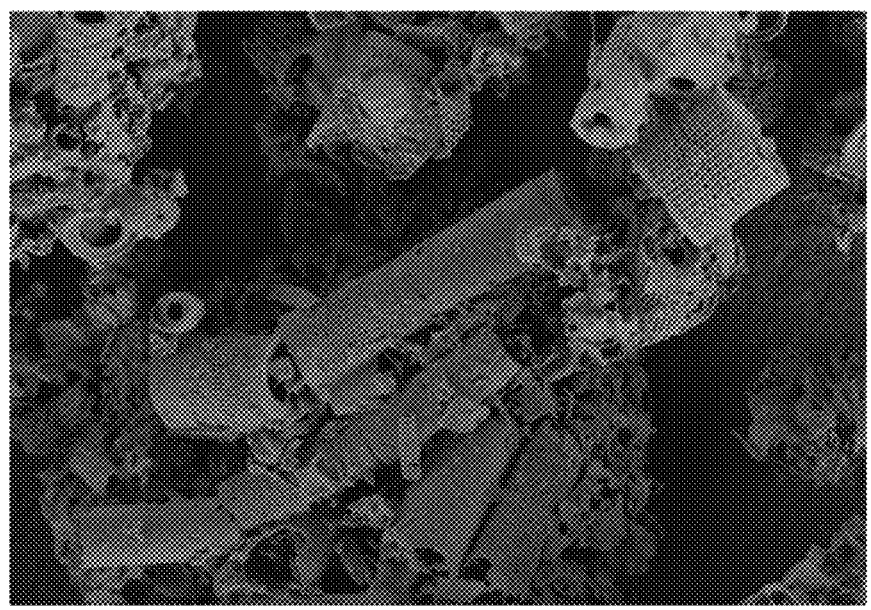
FIG. 27 is an image produced by a scanning electron microscope (SEM) illustrating diatoms coated with graphene using an embodiment of the method disclosed herein.
Figure 28:
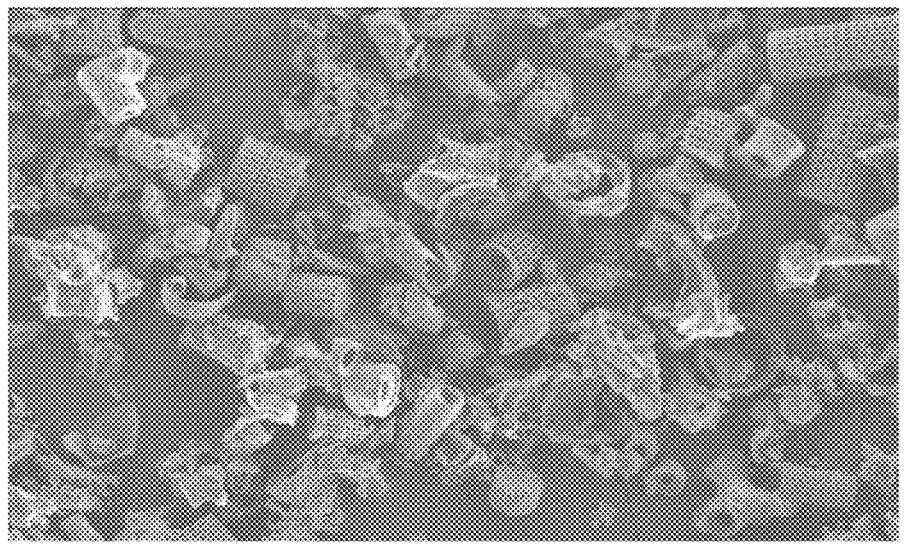
FIG. 28 is an image produced by a scanning electron microscope (SEM) illustrating uncoated diatoms.
Figure 29:
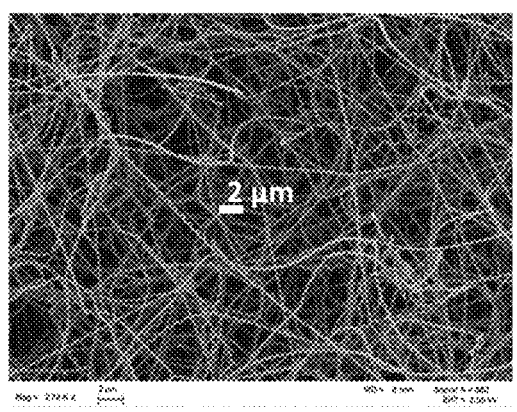
FIG. 29 is an image by a scanning electron microscope (SEM) illustrating nanosprings coated with the disclosed graphene material.
Figure 30:
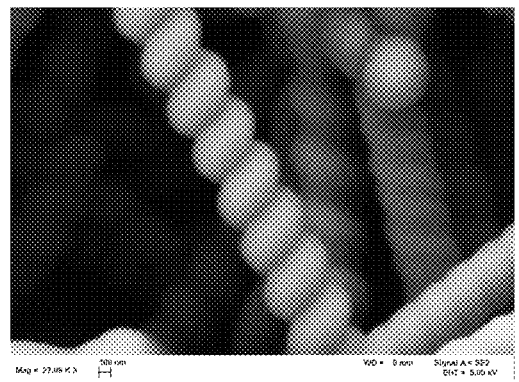
FIG. 30 is an expanded view of the image of FIG. 29.
Figure 31:
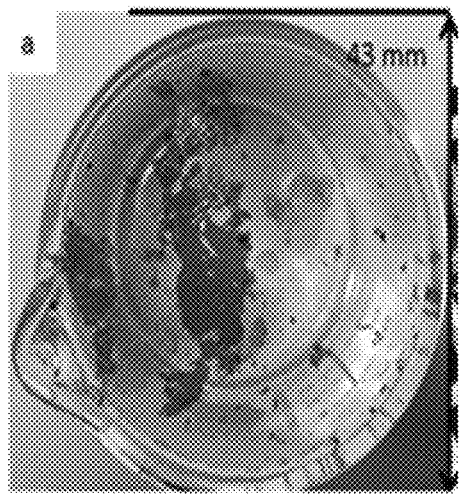
FIG. 31 is an optical image of large graphene sheets floating on the surface of water.
Figure 32:
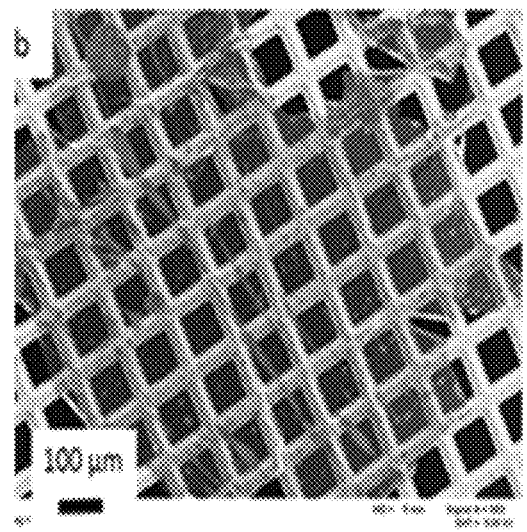
FIG. 32 is an SEM image of a graphene flake on a copper grid.

Some embodiments utilize the disclosed method to at least partially or fully coat particular materials or devices having coatable surfaces. Particular embodiments provide the ability to cover these materials in situ. For example, a coatable material (such as, but not limited to, nanotubes, halloysite nanotubes, diatoms, porous hollow glass microspheres, copper, iron, glass, silicon, and aluminum) is placed in the second container, proximal to the first container. The reaction vessel is then closed to the surrounding oxygen-rich atmosphere. Upon heating, the starting material and sulfur in the first container can react to form vapors. These vapors can then condense within the outer container where the graphene-coatable materials are located. Condensation of the vapors within the outer container will ultimately deposit graphene on the graphene-coatable materials either before or upon cooling of the system to room temperature. Cooling the system can comprise affirmatively reducing the temperature of the system using cooling methods known to a person of ordinary skill in the art, or cooling the system can comprise removing the heat source from the system whereby it equilibrates to the temperature of its surrounding environment. FIGS. 26 and 27 illustrate various graphene-coatable materials that were covered with graphene formed from roofing tar. FIG. 26 illustrates an image of a silicon wafer that has been coated in graphene, using the disclosed method. FIG. 27 illustrates diatoms coated in graphene, whereas FIG. 28 illustrates uncoated diatoms. Also, FIGS. 29 and 30 illustrate nanosprings coated with the disclosed graphene material. FIG. 31 is a digital image of large flakes of the disclosed graphene material that can be made using embodiments of the disclosed method. In exemplary embodiments, the graphene material can be grown on a copper grid, as illustrated in FIG. 32.

B. Graphene Electrode

Disclosed herein are embodiments of a graphene electrode that comprise the graphene material made using embodiments of the method disclosed herein. The physical and chemical properties of embodiments of the disclosed graphene electrode, and the graphene material used to make such an electrode, have structural and electrochemical characteristics superior to those of known electrodes known in the art. In addition to these superior physical and chemical properties, embodiments of the graphene electrode disclosed herein are economically feasible in comparison to commonly used types of electrodes. For example, the disclosed graphene material can easily be coupled with inexpensive high surface area substrates (both anodic and cathodic substrates), unlike some materials known in the art (e.g., boron-doped diamond) given the preparation and/or availability limitations associated with such materials. Additionally, the method of making the graphene material can be used to produce graphene having a high surface area using relatively low-cost starting materials and fabrication methods. Also, some embodiments of the disclosed graphene electrode exhibit increased rates of electron transfer in comparison to known materials.

1. Structural Characteristics of the Graphene Electrode

Some graphene electrode embodiments disclosed herein comprise a graphene material comprising structural defects within the expected six-membered ring unit cell. These structural defects contribute to the superior electrochemical characteristics of the disclosed graphene electrode.

Figure 41:
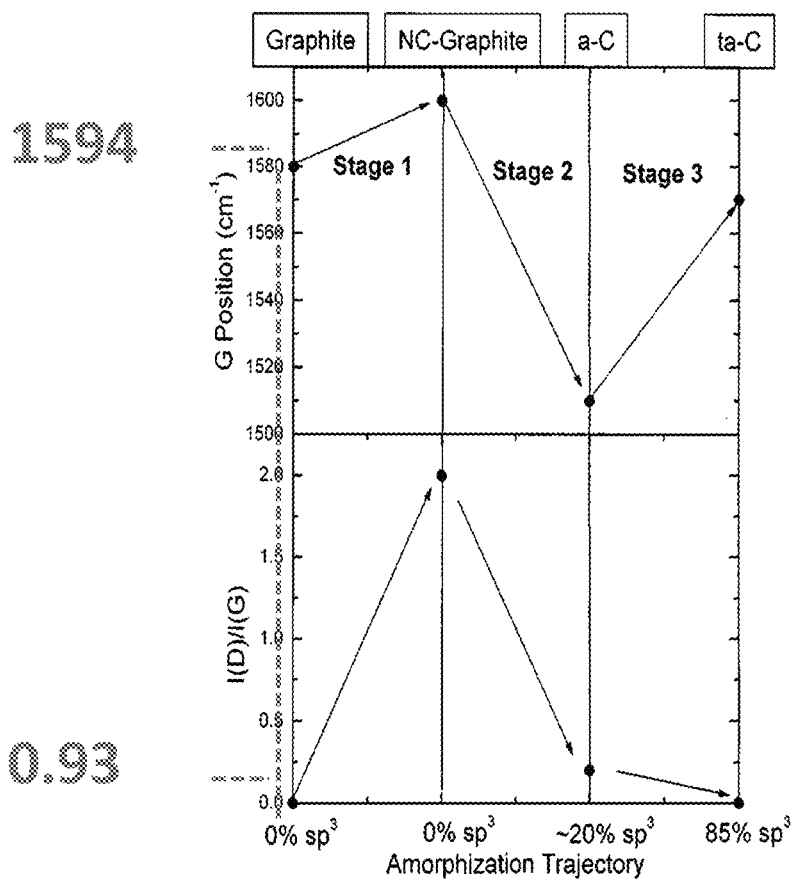
FIG. 41 is a graph of the Ferrari amorphization trajectory as applied to an embodiment of the disclosed graphene material.
Figure 42:
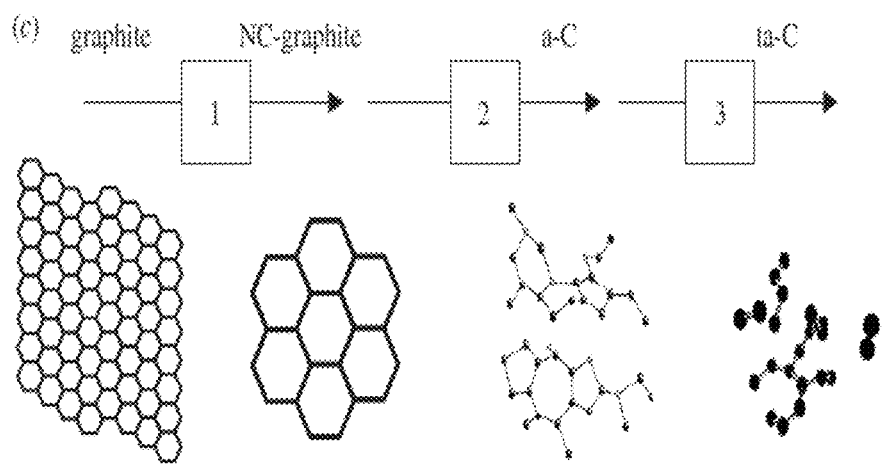
FIG. 42 is a graph that correlates each stage of FIG. 41 to the predicted structure of the material.

Raman spectral analysis was used to determine the chemical and physical properties of certain disclosed graphene materials. Raman analysis provides two different peaks corresponding to the D-band and G-band (see, for example, FIG. 38). The ratio of the intensities of the D-band at about 1354 cm$^{-1}$ and the G-band at about 1593 cm$^{-1}$ can be used to determine the hybridization of the graphene material. The calculated ratio from particular exemplary embodiments was used to determine that the analyzed graphene material comprised sp2-hybridized carbon atoms and that it has a microcrystalline structure. The sp2 hybridization can be corroborated by applying Ferrari's amorphization trajectory, as disclosed in Ferrari et al. "Interpretation of Raman spectra of disordered and amorphous carbon." *Phys. Rev. B: Condens. Matter* 2000; 61(20): 14095-14107, which is incorporated herein by reference. FIG. 41 provides a graphical illustration of the stages associated with the Ferrari amorphization trajectory. FIG. 42 provides a schematic illustration that correlates the various trajectory stages provided in FIG. 41 to the predicted structure of the carbon-based material.

Figure 43:
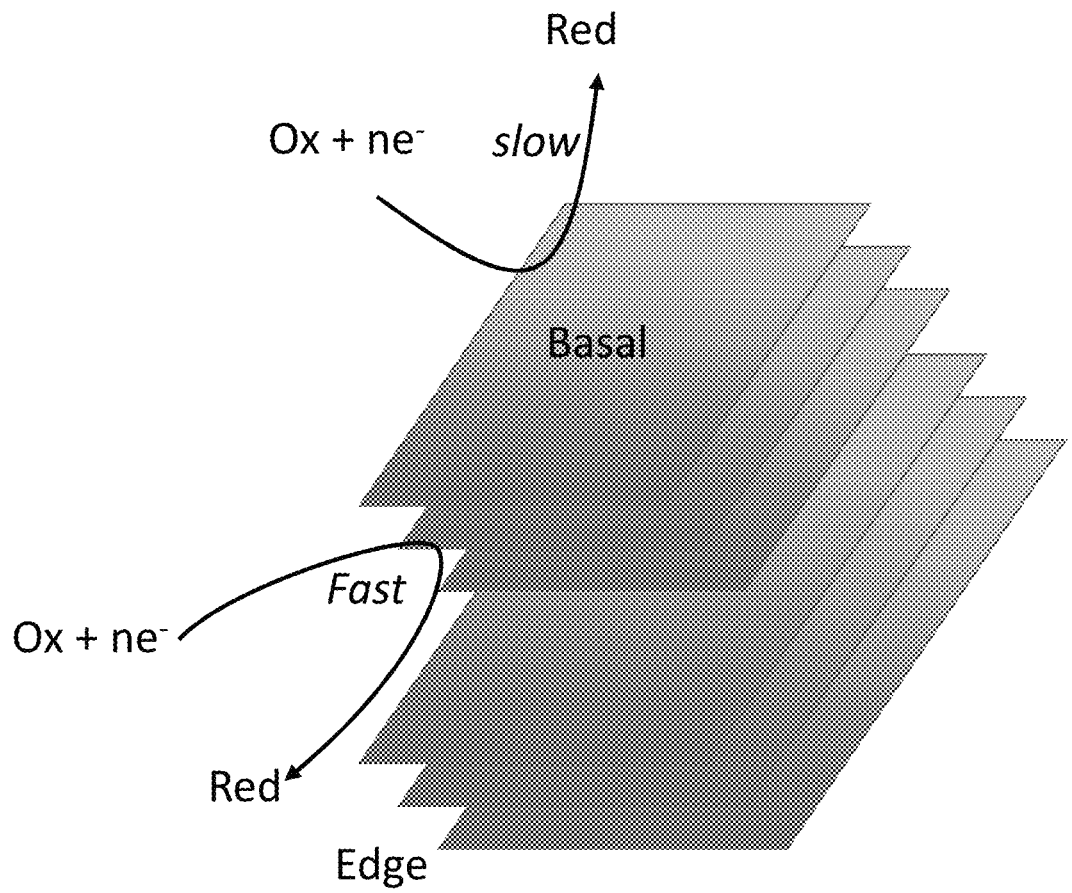
FIG. 43 is a schematic diagram that illustrates the differences between electron transfer rates for edge-based transfers and for basal plane transfers.

The graphene material of the disclosed graphene electrode is physically distinct from other carbon-based materials known in the art. For example, HOPG and chemical vapor deposited graphene exhibit surfaces that contain exposed graphene edges. Boron-doped diamond has a high degree of sp3 hybridization, whereas glassy carbon, another material known in the art, is a disordered sp2-hybridized material that has a high degree of exposed graphitic edges at the surface. In contrast, the graphene material made using embodiments of the method disclosed herein primarily contains sp2-hybridized carbon atoms and its surface comprises basal planes rather than edges. Embodiments of the graphene electrode disclosed herein exhibit facile electron transfer kinetics between a dissolved redox species and these exposed basal planes (as opposed to graphitic edges). A schematic illustration of this concept is provided by FIG. 43.

In certain embodiments, the Tuinstra-Koenig relationship, where $I_D/I_G = C(\lambda)/L_a$, can be used to determine the effective grain size of the disclosed graphene material. In some embodiments, this formula was used to determine that embodiments of the disclosed graphene material have an effective grain size ($L_a$) ranging from about 2 nm to about 15 nm (such as about 2 nm to about 10 nm, or 2 nm to about 8 nm). Particular embodiments were determined to have an effective grain size of about 5 nm. In contrast, chemical vapor deposited graphene products known in the art typically have an effective grain size of 250 nm. HOPG also has larger effective grain sizes, typically ranging from 1 μm to 10 μm.

Figure 44:
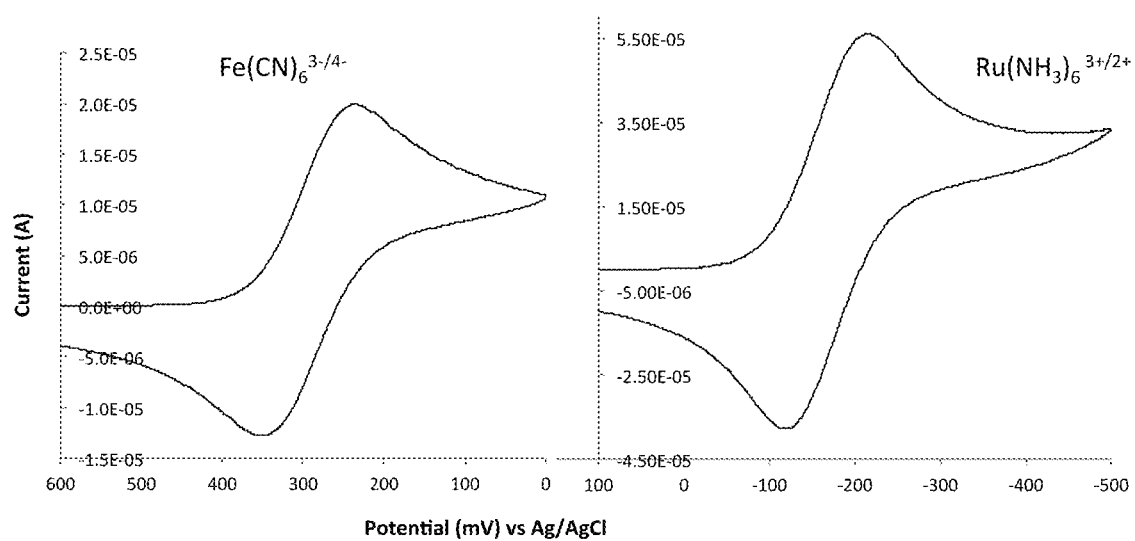
FIG. 44 is a graph of current (A) versus potential (mV vs. Ag/AgCl) and illustrates cyclic voltammograms of Ru $(NH_3)_6^{3+/2+}$ and $Fe(CN)_6^{3-/4-}$ with a 1 $cm^2$ graphene anode in 0.1 M KCl at a potential sweep rate of 0.1 V $s^{-1}$.

Embodiments of the graphene electrode disclosed herein can be used as the anodic portion of an electrode suitable for use in the many different technologies disclosed herein, but the disclosed graphene material also can be used to provide a graphene-coated cathode. In some embodiments, the graphene anode's reactivity is evidenced by the disclosed graphene material's ability to act as a conductive material. In some embodiments, the graphene material's conductive and metalloid-like characteristics can be determined by measuring cyclic voltammetric responses and determining the observed peak separation. In particular disclosed embodiments, the conductivity of the disclosed graphene material (particularly in the form of an embodiment of the graphene anode disclosed herein) can be determined using a suitable redox system. In some embodiments, a Ru(NH$_3$)$_6^{3+/2+}$ and Fe(CN)$_6^{3-/4-}$ redox system can be used. In this system, the Ru(NH$_3$)$_6^{3+/2+}$ couple undergoes an outer-sphere electron transfer and is insensitive to surface microstructure and oxides. The Fe(CN)$_6^{3-/4-}$ couple is a quasi-reversible system sensitive to electrode surface microstructure and impurities on carbon electrodes. A graphitic counter electrode and an Ag/AgCl reference electrode may also be used. An exemplary cyclic voltammetric (CV) response is illustrated in FIG. 44, which illustrates cyclic voltammograms (CV) of both redox systems at a potential sweep rate (v) of 100 mV s$^{-1}$ using the disclosed graphene anode. These results are quantified in Table 2. The reductive currents in the two cyclic voltammograms illustrated in FIG. 44 likely are due to the reductions illustrated in Equations 1 and 2 (shown below), with the electrode-based oxidations being the reverse of these equations.

$$Fe^{III}(CN)_6^{3-} + e^- \rightarrow Fe^{II}(CN)_6^{4-} \qquad \text{(Equation 1)}$$

$$Ru^{III}(NH_3)_6^{3+} + e^- \rightarrow Ru^{II}(NH_3)_6^{2+} \qquad \text{(Equation 2)}$$

Table 2, below, compares the cyclic voltammetric ($\Delta E_p$) behavior of embodiments of the disclosed graphene electrode using Ru(NH$_3$)$_6^{3+/2+}$ and Fe(CN)$_6^{3-/4-}$ couples to the behavior of exemplary carbon-based materials reported in the literature, such as boron-doped diamond, HOPG, glassy carbon and other known materials.

TABLE 2

Peak Separation $\Delta E_p$ (mV) obtained from the cathodic and anodic waves of 1 mM Fe(CN)$_6^{3-/4-}$ and of 1 mM Ru(NH$_3$)$_6^{3+/2+}$ cyclic voltammograms at 100 mV/s on various carbon electrodes in 1M KCl(aq).

| Component | Fe(CN)$_6^{3-/4-}$ $\Delta E_p$ (mV) | Ru(NH$_3$)$_6^{3+/2+}$ $\Delta E_p$ (mV) |
|---|---|---|
| Disclosed Graphene Electrode | 80 | 71 |
| Anodized epitaxial graphene | 81 | 81 |
| Reduced-graphene oxide | 65 | 61 |
| Edge plane pyrolytic graphite | 60 | — |
| Basal plane pyrolytic graphite | 242 | — |
| Boron doped diamond | 282 | 101 |
| Boron doped diamond | 71 | 74 |
| Highly Ordered Pyrolytic Graphite (HOPG)* | 700-1370 | 285 |
| Glassy Carbon | 68 | 64 |
| Glassy Carbon | 88 | 151 |

*200 mV/s. Both anodized epitaxial graphene and reduced graphene-oxide are not flat electrodes.

Figure 45:
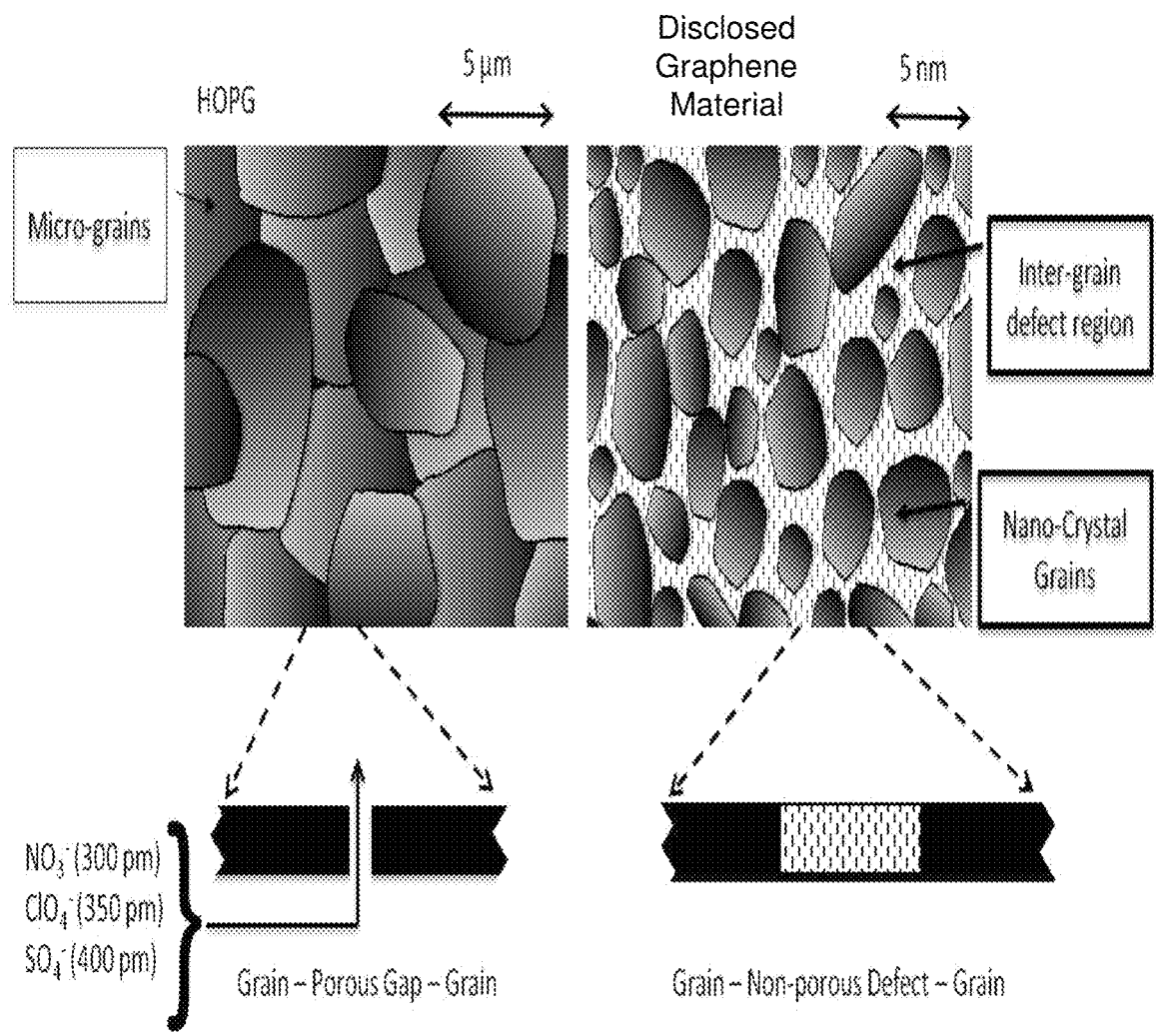
FIG. 45 is an image illustrating the defects associated with the disclosed graphene material in comparison to an HOPG sample.

As illustrated in Table 2, embodiments of the disclosed graphene electrode exhibit a $\Delta E_p$ for Ru(NH$_3$)$_6^{3+/2+}$ and Fe(CN)$_6^{3-/4-}$ that is different from the other listed carbon materials. The peak separation values obtained from the disclosed graphene electrode also are contrary to those that should be obtained from molecularly flat, carbon-based materials known in the art. For example, the large $\Delta E_p$ of HOPG provided in Table 2 indicates a kinetic barrier to electron transfer with $Fe(CN)_6^{3-/4-}$ and $Ru(NH_3)_6^{3+/2+}$. This large barrier to electron transfer with the basal planes of HOPG is attributed to the low densities of states near the Fermi-level of this material. Boron-doped diamond, for example, also has a larger $\Delta E_p$ than that obtained for the disclosed graphene electrode. These large peak separations indicate a greater barrier to electron transfer with dissolved redox species. Also, it is known in the art that graphene electrodes comprising chemical vapor deposited graphene have flat basal planes that have large barriers to electron transfer with redox species. These large barriers also have been attributed to the low densities of states, as with HOPG. In contrast, the graphene material of the disclosed graphene electrode comprises structural defects incorporated into its lattice structure that enhance electron transfer with dissolved redox species through its basal planes. Without being limited to a particular theory of operation, it is currently believed that these structural defects may allow for greater densities of states, thus facilitating the faster electron transfer with dissolved redox species. An illustration comparing the proposed defects associated with the disclosed graphene material and an HOPG material is provided by FIG. 45.

2. Anodic Stability of the Graphene Electrode

A feature of carbon-based electrodes, or the anodic materials used in such electrodes, that should be considered when determining the use of such electrodes in the technologies disclosed herein is anodic stability. Electrodes used in many of the technologies disclosed herein should exhibit sufficient anodic stability to ensure proper electrochemical performance. Dimensionally stable anodes typically are desired for electrodes used in the technologies disclosed herein, particularly those having long service lives in electro-oxidation applications. In some embodiments, the disclosed graphene electrode may comprise a dimensionally stable graphene anode that exhibits anodic stability superior to that of many different currently known anodes. Embodiments of such a graphene anode exceed the thermodynamic limit for corrosion onset and therefore can resist corrosion more effectively than other materials known in the art.

The anodic limit of an anode material is based on the kinetics of corrosion and water oxidation. For carbon materials, the following half reactions apply (Equations 3 and 4), with these reactions being suitable for predicting the thermodynamic limit for corrosion onset. The anodic limits are provided by Equations 3 and 4.

$C+2H_2O \rightarrow CO_2+4H^++4e^-$  0.207 V vs. SHE   (Equation 3)

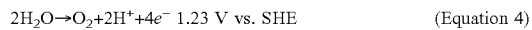

$2H_2O \rightarrow O_2+2H^++4e^-$  1.23 V vs. SHE   (Equation 4)

$4H^++4e^- \rightarrow 2H_2$   (Equation 5)

In neutral solutions, the thermodynamic corrosion onset is 0.621 vs. SHE. Anodic limits depend on overpotentials for both Equations 3 and 4 and the cathodic limit depends on overpotentials for Equation 5. Certain embodiments of the disclosed graphene electrode exhibit higher anodic stability than other carbon-based anodes that are typically used in the art (e.g., boron-doped diamond, pyrolytic graphite, HOPG, etc.), indicating that the disclosed graphene electrode is just as resistant to corrosion, if not more so, than these common anodes. The disclosed graphene electrode also exhibits a high $H_2$ overpotential, which is another feature superior to other electrodes known in the art and which results from the superior electrochemical properties of the disclosed graphene material. For example, the $H_2$ overpotentials of certain metal electrodes known in the art range from 0.1 to 0.5 V, whereas these overpotentials range from 0.2 to 0.6 V for known carbon electrodes. In contrast, the disclosed graphene material exhibits an $H_2$ overpotential of about at least 1 V.

Another property that should be considered when determining a suitable electrode for use in particular technologies disclosed herein is the "electrochemical window" of the electrode. In some embodiments, the disclosed graphene material may be used in aqueous applications as it exhibits a suitable electrochemical window for such conditions.

The "electrochemical window" of water is dictated by the rates of its reduction and oxidation at electrode surfaces. Taken together, thermodynamics predict this window to be 1.23 V on an electrode surface. Kinetic barriers increase this voltage. Additionally, both water oxidation and reduction can interfere with desired electrode-based redox and/or capacitive processes. In some symmetric electrodes (i.e., where the anode and cathode are the same material), such as glassy carbon and platinum electrodes, the electrochemical window is limited to 2.04 V and 1.9 V, respectively. When considering aqueous energy storage, chemical sensing, and oxidation of pollutants, this window may not be desirable as higher hydrogen and oxygen overpotentials are desired in these instances. Particular disclosed embodiments of the graphene electrode disclosed herein have a high electrochemical window, with particular values being provided in Table 3 and the corresponding cyclic voltammograms provided in FIG. 47.

TABLE 3

Cathodic and anodic potential limits on the disclosed graphene electrode as extracted from FIG. 2.0.1 at a current density of 200 μA/cm². Standard deviations are calculated for n = 3.

| | Disclosed graphene potential limits (V) vs SHE | | |
|---|---|---|---|
| 1M Aqueous Electrolyte | Anodic | Cathodic | Total window (V) |
| $H_2SO_4$ | 2.70 ± 0.11 | −1.41 ± 0.11 | 4.11 |
| $KNO_3$ | 2.40 ± 0.04 | −1.01 ± 0.13 | 3.41 |
| $LiClO_4$ | 2.02 ± 0.03 | −1.46 ± 0.02 | 3.48 |
| $(NH_4)_2SO_4$ | 2.20 ± 0.00 | −1.49 ± 0.12 | 3.69 |
| $H_3PO_4$ | 2.10 ± 0.00 | −1.14 ± 0.06 | 3.24 |

Embodiments of the disclosed graphene electrode exhibit electrochemical windows that exceed those exhibited by anodes known in the art. For example, Table 4 provides a summary of some literature values of known anodes as well as a particular embodiment of the disclosed graphene electrode. As illustrated by Table 4, the graphene electrode comprising the graphene material made using embodiments of the method disclosed herein exhibited a much higher (by at least 1 volt) electrochemical window than materials known in the art.

TABLE 4

Potential limits (hydrogen and oxygen evolution overpotentials) for various electrode materials.

| Material | Cathodic limit (V) | Anodic limit (V) | Total window (V) | $H_2SO_4$ (M) |
|---|---|---|---|---|
| Disclosed Graphene electrode | −1.413 | 2.7 | 4.11 volts | 1.0 |

TABLE 4-continued

Potential limits (hydrogen and oxygen evolution overpotentials) for various electrode materials.

| Material | Cathodic limit (V) | Anodic limit (V) | Total window (V) | $H_2SO_4$ (M) |
|---|---|---|---|---|
| HOPG | −0.413 | 1.667 | 2.08 | |
| GC | −0.504 | 1.536 | 2.04 | |
| Boron-doped diamond | −0.488 | 2.127 | 2.62 | |
| Diamond-like carbon | −0.933 | 2.037 | 2.97 | |
| Pyrolyzed Photoresist film | −0.556 | 1.444 | 2.0 | 0.1 |
| Annealed diamond | 0.005 | 1.295 | 1.3 | 0.1 |
| GC | −0.795 | 1.195 | 1.99 | |
| Boron-doped diamond | −0.956 | 2.324 | 3.28 | 0.1 |
| Boron-doped diamond | −1.056 | 2.444 | 3.5 | |
| Boron-doped diamond† | −1.20 | 1.9 | 3.1 | 0.5 |
| | −0.80 | 2.3 | 3.1 | |
| | −0.80 | 2.0 | 2.8 | |
| | −0.70 | 1.8 | 2.5 | |
| | −0.75 | 2.35 | 3.1 | 0.5 |
| Nitrogen-doped amorphous carbon | −1.106 | 2.254 | 3.36 | 0.1 |
| GC | −0.396 | 1.544 | 1.94 | |
| Diamond-like carbon | −0.956 | 2.454 | 3.41 | 0.5 |
| Boron-doped diamond | −1.25 | 2.3 | 3.55 | |
| Boron-doped diamond | −0.545 | 1.955 | 2.5 | 0.1 |
| Platinum | −0.103 | 1.797 | 1.9 | 0.15 |

†Reference electrode is hydrogen electrode in the same solution (HESS).

Figure 46:
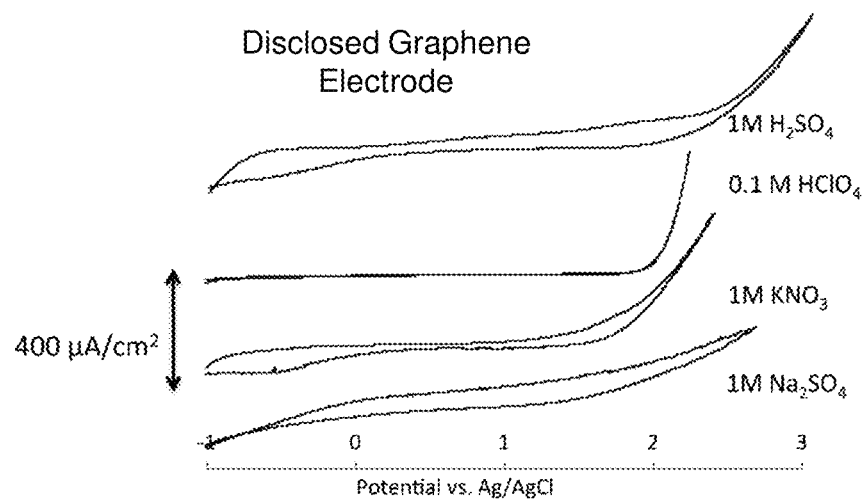
FIG. 46 is a graph of current ($\mu A/cm^2$) versus potential (V vs. Ag/AgCl) and illustrates cyclic voltammograms of an embodiment of the graphene anode disclosed herein operated at 50 mV/s in various electrolytes.

The service life of an anode can be extrapolated from the observed maximum positive potential before the onset of an anodic current. In particular disclosed embodiments, the oxidative stability of an electrode comprising the disclosed graphene material can be determined. The cyclic voltammetric scan provided in FIG. 46 demonstrates the oxidative stability of an embodiment of a graphene electrode disclosed herein. In 1 M $H_2SO_4$ the graphene electrode had a significantly higher potential required to reach a 200 µA/cm² current density when compared to the reference glassy carbon and literature graphene electrode materials (i.e., HOPG and boron-doped diamond). Similar results were observed for samples in $HClO_4$, $KNO_3$, and $Na_2SO_4$.

When considering corrosion (Equation 3) and water electro-oxidation (Equation 4), the presently disclosed graphene material is one of the most kinetically stable materials in the art. Table 5 provides results obtained using the disclosed graphene material and other types of anode materials with an $H_2SO_4$ electrolyte.

TABLE 5

Observed onset potentials for oxygen evolution with an electrode embodiment of the disclosed graphene material and other dimensionally stable anodes.

| Dimensionally Stable Anodes | Oxygen evolution onset potential (V) vs. SHE | Conditions |
|---|---|---|
| Disclosed graphene material | 2.7 | 1M $H_2SO_4$ |
| Graphite | 1.7 | 0.5M $H_2SO_4$ |
| Ruthenium Oxide | 1.47 | 0.5M $H_2SO_4$ |
| Iridium Oxide | 1.52 | 0.5M $H_2SO_4$ |
| Platinum | 1.6 | 0.5M $H_2SO_4$ |
| Tin Dioxide | 1.9 | 0.05M $H_2SO_4$ |
| Lead Dioxide | 1.9 | 1M $H_2SO_4$ |
| Boron Doped Diamond | 2.3 | 0.5M $H_2SO_4$ |

Figure 48:
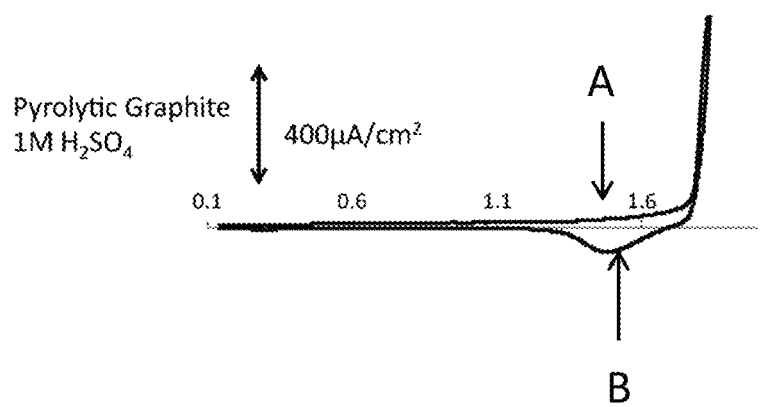
FIG. 48 is a graph of current (μA/cm$^2$) versus potential (V vs. Ag/AgCl) and illustrates a cyclic voltammogram obtained from a pyrolytic graphite electrode in 1M $H_2SO_4$ illustrating electrolyte intercalation.
Figure 49:
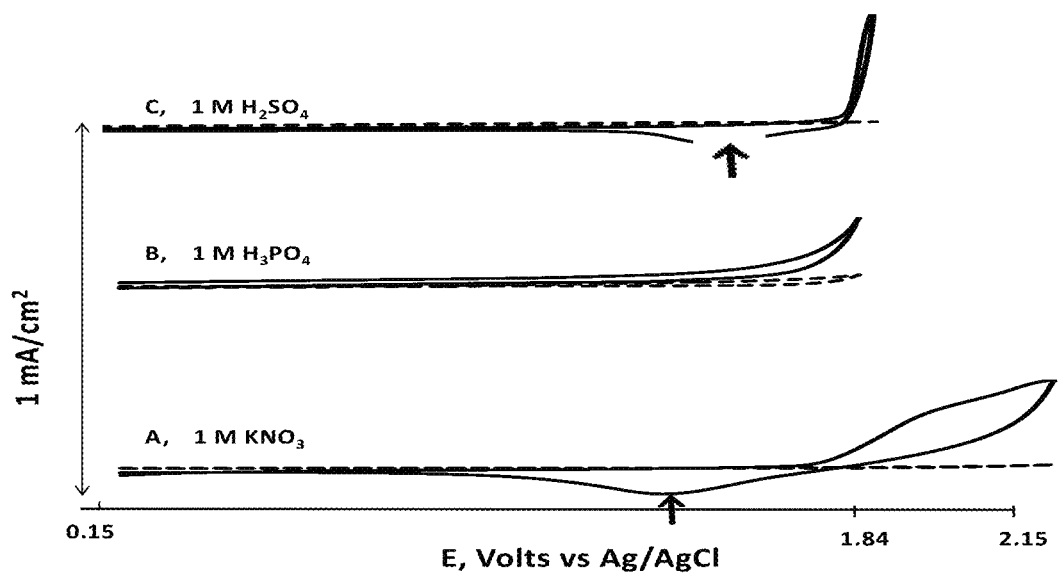
FIG. 49 is a graph of current (μA/cm$^2$) versus potential (V vs. Ag/AgCl) and illustrates cyclic voltammograms of an embodiment of the graphene anode disclosed herein (dashed lines), and pyrolytic graphite (solid lines) in various different electrolytes.
Figure 50:
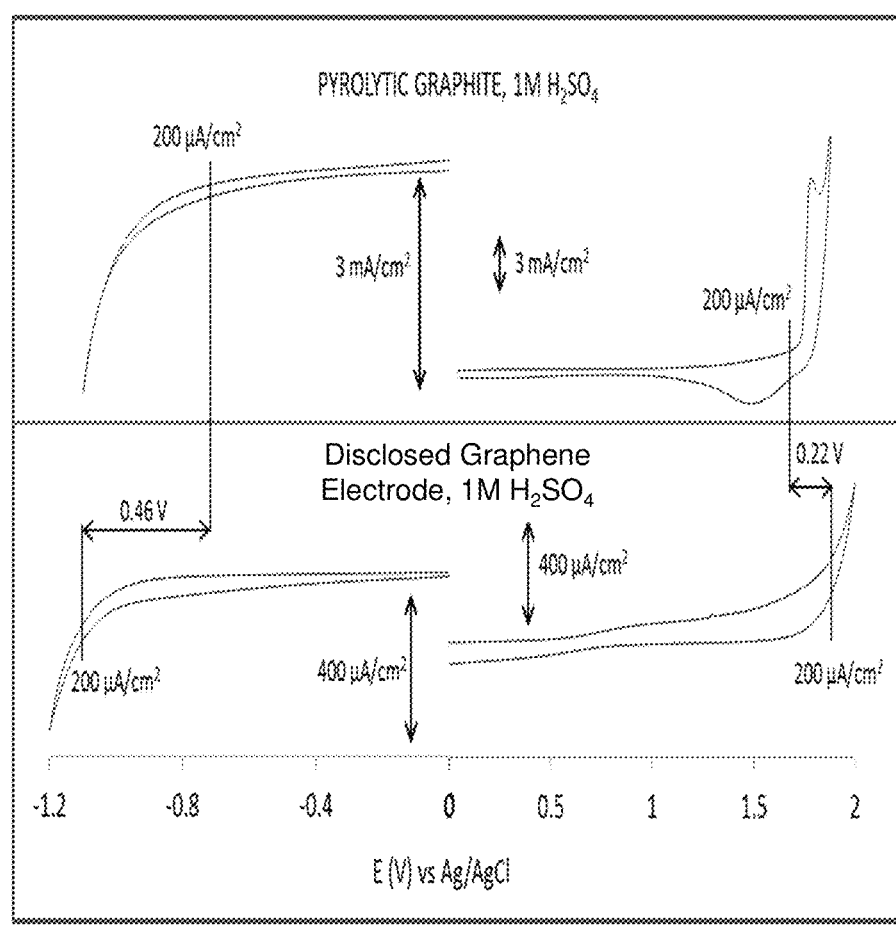
FIG. 50 is a combined graph illustrating cyclic voltammograms of pyroltic graphite and the disclosed graphene material.

The disclosed graphene electrode also is more resistant to corrosion due to its physical and chemical properties. For instance, the corrosion of HOPG anodes known in the art likely is initiated by intercalation of aqueous electrolyte through the grain boundaries into sub-surface layers. Intercalation of electrolyte into HOPG is detectable by a reductive current on the reverse sweep of an anodic cyclic voltammogram where the cathodic and anodic charge ratio ($Q_c/Q_a$) is greater than zero. FIGS. 48 and 49 show that a pyrolytic graphite electrode has this characteristic (compare line A versus line B of FIG. 48). The pyrolytic graphite electrode likely exhibits electrolyte leakage through the grain edges. On the other hand, electrodes comprising the disclosed graphene material lack this behavior (see FIGS. 48 and 49). As indicated by FIGS. 48 and 49, the observed $Q_c/Q_a$ was zero in all cases and therefore corroborates that the disclosed graphene electrode does not allow electrolyte intercalation through its basal plane. An additional comparison of pyroltyic graphite and the disclosed graphene material is provided by FIG. 50.

Figure 51:
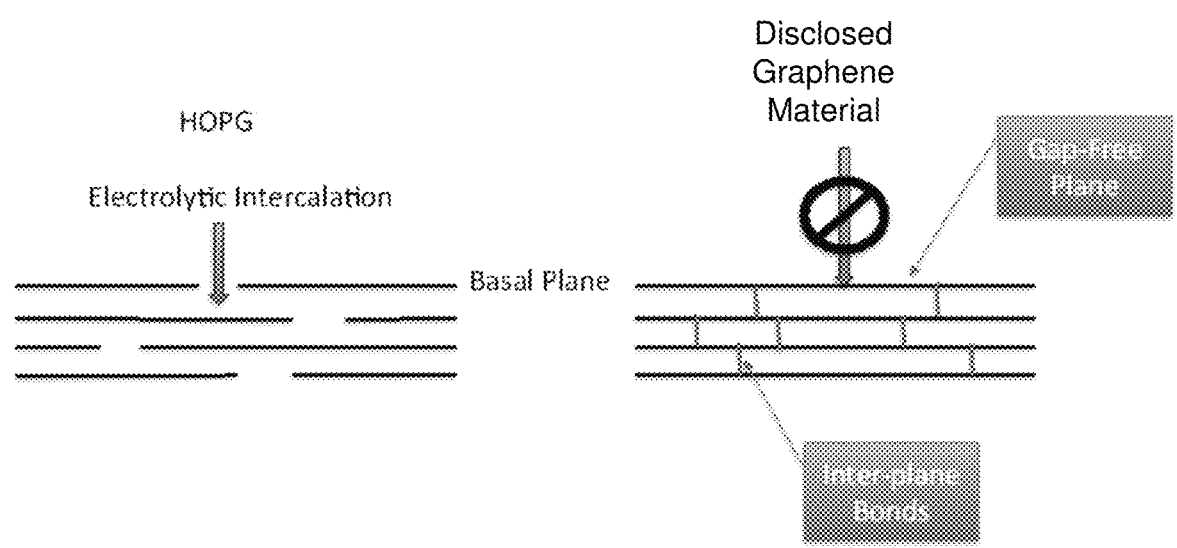
FIG. 51 is a schematic illustration of corrosion initiation through intercalation observed in HOPG and further illustrates the features of the disclosed graphene anode that prevent such intercalation.

Despite its much smaller effective grain size, the disclosed graphene electrode does not allow for electrolyte intercalation during the time scales of the cyclic voltammetric experiments. This lack of electrolyte intercalation indicates that the graphene layer of the graphene electrode comprises grain boundaries that are coupled together through covalent links and/or that there are interplanar bonds that control flow of electrolyte through its bulk. This morphology is illustrated by FIG. 51.

The disclosed graphene material also is resistant to sulfation and $H_2$ evolution. For example, in some embodiments the disclosed graphene material is suitable for use in batteries, such as redox flow batteries, as well as fuel cells. Given the disclosed graphene material's unique structural characteristics, electrochemical properties, and its natural hydrophobicity, this material is able to suppress hydrogen gas evolution and/or lead sulfate crystal formation that typically impede battery/fuel cell performance. In some embodiments, the disclosed graphene material can provide a complete connective network between electrodes of batteries and/or fuel cells, thus enhancing performance and reducing the amount of energetic material typically wasted in these types of systems.

3. Method of Making a Graphene Electrode

In some embodiments, the disclosed graphene electrode is made using a method comprising providing a substrate (e.g., a solid substrate), depositing a graphene layer on the substrate, and coupling the graphene layer to a support layer. In other disclosed embodiments, the graphene electrode can be made by depositing the graphene layer onto the substrate in situ. In some embodiments, an adhesive component is added to the support layer to adhere the graphene material to the support layer. In some embodiments, an adhesive may be a synthetic polymer, an epoxy, or combination thereof. In particular embodiments, the adhesive is silicone, bisphenol A expoxy resin, bisphenol F epoxy resin, a novolac epoxy resin, an aliphatic epoxy resin, a glycidylamine epoxy resin, or combinations thereof. Other components can be used to facilitate adhesion of the graphene material to the support layer. For example, an organic solvent can be applied to a top surface of the support layer and thereby facilitate adhesion of the graphene material. Suitable solvents may be used to facilitate adhesion. For example, organic solvents may be used, with certain suitable organic solvents being selected from acetone, ethyl acetate, acetonitrile, methylene chloride, or combinations thereof. Some embodiments of the graphene electrode therefore may comprise an adhesive, while other embodiments may be adhesive-free.

Figure 52:
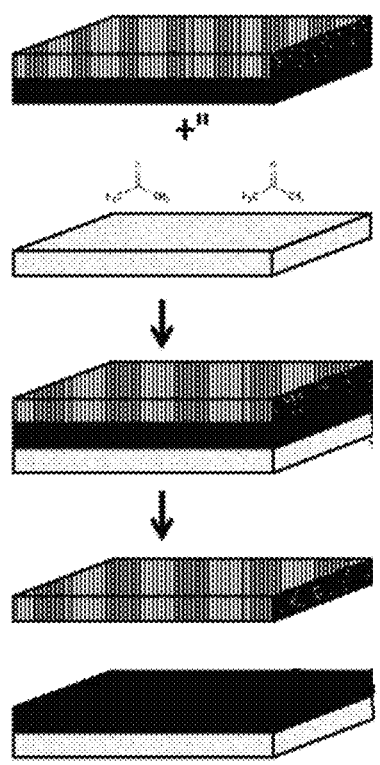
FIG. 52 is a schematic diagram illustrating an embodiment of a method of making a graphene anode according to the present disclosure.
Figure 53:
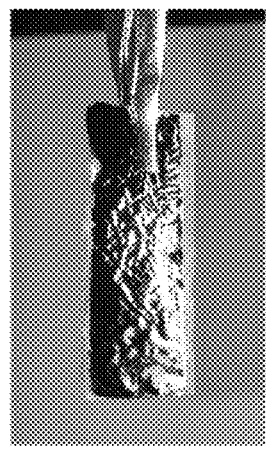
FIG. 53 is a digital image of an embodiment of the graphene anode disclosed herein.

A schematic diagram illustrating an embodiment of the disclosed method of making a graphene electrode is provided by FIG. 52. As illustrated by FIG. 52, a solid substrate comprising a layer of graphene is exposed to a support layer that has been treated with a component capable of facilitating adhesion. The support layer is allowed to couple to the graphene layer and the solid substrate is subsequently removed. FIG. 53 is a digital image of an embodiment of a graphene electrode comprising the disclosed graphene material. In particular disclosed embodiments, the substrate may comprise silicon, a polymeric compound, or combinations thereof. In particular disclosed embodiments, the substrate is a silicon wafer. The support layer can be any material suitable for use in an electrode or any one of the particular technologies disclosed herein. In some embodiments, the support layer can comprise a polymer. For example, the polymer may be an organic polymer. Suitable exemplary organic polymers may be selected from polystyrene, polypropylene, polyvinyl chloride, polyethylene, or combinations thereof. In particular disclosed embodiments, the support layer is polystyrene. In other embodiments, the support layer can be selected from nanomaterials (e.g., nanosprings), a particle-like material (e.g., diatomaceous earth), or combinations thereof. Substrates disclosed herein can be used to provide a graphene electrode having a high aspect ratio.

C. Electrochemical devices comprising graphene

Disclosed herein are embodiments of an electrochemical device, comprising a positively charged electrode, a negatively charged electrode, a graphene layer comprising graphene having a substantially micro-crystalline grain size ranging from about 2 nm to about 15 nm, basal planes that are substantially planar, and a total electrochemical window of from at least about 3 V to about 5 V, and an electrolyte. In particular embodiments, the graphene layer covers at least a portion of the positive electrode, the negative electrode, or both. Suitable electrolytes are disclosed herein.

1. Water Purification Cells Comprising Graphene Electrodes

The disclosed graphene material, and electrodes comprising the material, can be effectively used to purify and/or disinfect water, such as disinfection and purification of wastewater polluted with contaminants. In particular disclosed embodiments, the disclosed graphene electrode may be used in a water purification cell to decompose common contaminants found in ground water. The disclosed graphene electrode can be used to degrade any organic contaminant. In some embodiments, the organic contaminant is any organic contaminant capable of being mineralized, such as, solely by way of example, carbon dioxide, formic acids, carbonic acids, oxalates, and the like. In some embodiments, the contaminants may be carbon tetrachloride, TCE, diatrizoate, 2-CAP, TNT, NDMA, nitrate, nitrite, perchlorate, or chlorate.

Dimensionally stable anodes (DSAs) are needed for an electrochemical oxidation apparatus capable of promoting electrochemical purification. To conduct electro-oxidation of contaminants in aqueous solutions, a high oxygen overpotential is desired to prevent out-gassing and to increase the current efficiency of the process. Accordingly, certain known carbon-based materials are not suited for such applications, whereas the disclosed graphene material is suitable for use in an anode that is able to meet this high oxygen overpotential. The two competing half-reactions involved in electrochemical-based remediation are illustrated below in Equations 6 and 7. With reference to Equation 6, $C_xH_yO_z$ represents the targeted organic xenobiotics.

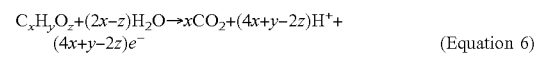
(Equation 6)

(Equation 7)

Anodic materials for purifying wastewater exist in the art; some of these known materials are provided in Table 6 (i.e., graphite, ruthenium oxide, iridium oxide, platinum, tin dioxide, lead dioxide, and boron doped diamond). Other known anodic materials include those having a titanium base modified with thin conducting ruthenium or iridium oxide layers. These known systems, however, are not cost effective and often exhibit poor conductivity and low current efficiency. Platinum anodes also are not cost effective and can exhibit relatively low oxygen evolution overpotential, though they can exhibit high conductivity and stability. Lead dioxide electrodes have weak adsorption properties and often can cause release of lead ions, especially in basic solutions. In contrast, carbon and graphite electrodes are inexpensive and can be fabricated with high surface area; however, the electrodes of this nature that currently exist in the art are often unstable and have a relatively short service life. For example, boron-doped diamond electrodes can have good anodic stability with an oxygen evolution overpotential greater than tin dioxide; however, these electrodes are expensive. Boron-doped diamond electrodes also are difficult to synthesize into a high surface area material as this material requires formation temperatures of at least 2,000° C., which limits the possible substrates into which it can be synthesized. In contrast, the disclosed graphene electrode provides chemical degradation in an efficient and cost-effective manner.

In some embodiments, the ability of electrodes comprising the disclosed graphene material to facilitate environmental remediation can be tested using methylene blue. In particular embodiments, degradation of methylene blue was conducted using a graphene electrode comprising graphene made using the method disclosed herein. In some embodiments, methylene blue (13 ppm, $\lambda_{max}$, =663 nm) was used to assess its anodic oxidation performance. Loss of molar absorbance is an indicator of oxidative degradation.

A comparison of methylene blue degradation results obtained using an embodiment of the disclosed graphene electrode and those previously obtained in the art using common carbon-based electrodes is provided below in Table 5. When compared to dimensionally stable anodes currently used in the art, the disclosed graphene electrode exhibited a normalized performance one- to three-orders of magnitude greater than other systems. Without being limited to a particular theory, it is currently believed that this superior performance may be attributed to the superior electron transfer characteristics of the disclosed graphene material versus the carbon-based electrodes known in the art.

TABLE 6

Comparison of Rate Constants of Methylene Blue
Electro-oxidation with Literature

| Electrodes | $k_{app}$ (min$^{-1}$) | Normalized $k_{app}$ (min$^1$cm$^{-2}$) |
|---|---|---|
| Disclosed graphene electrode | $4.28 \times 10^{-2}$ | $4.28 \times 10^{-2}$ |
| Boron-doped diamond | $1.71 \times 10^{-2}$ | $3.42 \times 10^{-4}$ |
| TiO$_2$/Carbon Aerogel | $8.89 \times 10^{-3}$ | $2.47 \times 10^{-3}$ |
| Bi$_2$WO$_6$/C$_{60}$ | $1.75 \times 10^{-2}$ | $2.02 \times 10^{-5}$ |

Graphene electrodes comprising the graphene material made using the method disclosed herein can be implemented in water purification systems. For example, the graphene material can be used in a water purification cell as an anode. In some embodiments, the graphene material can be deposited onto particle-like substrates, such as substrates like diatomaceous earth or particle-like nanomaterials. These graphene-coated substrates can then be packed and placed on a suitable electrode material. The electrode substrate comprising the graphene also can be substantially flat. In some embodiments, the water purification cell is constructed so that non-potable water may enter through an inlet, be exposed to a portion of the cell comprising a graphene-coated anode and a cathode (which also may be coated with the disclosed graphene material) to which electric current is supplied by a power source. The power source may be an external or an internal power source. Contaminants are then electrochemically degraded and potable water is expelled from an outlet of the cell.

2. Aqueous Ultracapacitors

Another example of an electrochemical device disclosed herein is an aqueous ultracapacitor comprising the disclosed graphene material. In some embodiments, the aqueous ultracapacitor can be a symmetric or asymmetric aqueous ultracapacitor. The aqueous ultracapacitor typically comprises: a positive electrode and a negative electrode, at least one of which comprises a graphene material having a substantially micro-crystalline grain size ranging from about 2 nm to about 15 nm, basal planes that are substantially planar, an electrochemical window of at least 3 V, and a capacitance ranging from at least 200 g/cm$^2$ to about 700 g/cm$^2$; and an aqueous electrolyte. In some embodiments, the ultracapacitor may further comprise a separator, and a current collector. In particular disclosed embodiments, the aqueous ultracapacitor produced from about 500 µJ/cm$^2$ to about 600 µJ/cm$^2$, such as from about 525 µJ/cm$^2$ to about 575 µJ/cm$^2$. In some particular embodiments, the aqueous ultracapacitor comprising the disclosed graphene material may produce about 550 µJ/cm$^2$ of stored energy.

In some embodiments, the disclosed graphene material—due to its high electrochemical window—can be used in aqueous ultracapacitors designed with cell voltages of about 2 V or higher, well beyond the 1 V cell potential of aqueous ultracapacitors known in the art (such as those comprising graphenic/metal oxides, and other metal materials). In some embodiments, the disclosed graphene material exhibits a capacitance ranging from about 200 µF/cm$^2$ to about 700 µF/cm$^2$, such as about 250 µF/cm$^2$ to about 675 µF/cm$^2$. In exemplary embodiments, the disclosed graphene material exhibits a capacitance of about 275 µF/cm$^2$ (at, for example, 0.8 V Ag/AgCl). In other embodiments, the disclosed graphene material can exhibit a capacitance of about 670 µF/cm$^2$. In some embodiments, the graphene material may be anodized to vary the capacitance using typical anodization methods, such as chromic acid anodizing, sulfuric acid anodizing, organic acid anodizing, phosphoric acid anodizing, borate and tartrate baths, or plasma electrolytic oxidation. In contrast to the high capacitance values that can be obtained with the disclosed graphene material, other materials known in the art exhibit capacitance values ranging only from about 10-100 g/cm$^2$. In some embodiments, the disclosed graphene material could be used to make a symmetrical capacitor cell and generate a cell potential of about 2 V (e.g., from about −1.1 to 0.9 V). The stored energy for such a capacitor therefore could be at least 550 µJ/cm$^2$, whereas the energy storage for capacitors using carbon-based materials known in the art typically is much lower. For example, capacitors comprising activated carbon exhibit energy storage of only about 4 µJ/cm$^2$ and capacitors comprising graphene derivatives have an upper limit of energy storage of only about 60 µJ/cm$^2$.

The capacitance and energy storage capabilities of the disclosed graphene material also render it applicable in other applications, such as electrochemical sensors and/or electrochemical pollutant oxidation/reduction reactors. Yet further embodiments of the disclosed electrochemical device include fuel cells, redox flow batteries, and the like.

V. EXAMPLES

The following examples are provided to exemplify certain features of working embodiments. A person of ordinary skill in the art will appreciate that the scope of the present invention is not limited to the working features of such examples.

Chemicals:

Starting materials consisted of various ratios elemental sulfur (99.5% Alfa Aesar, Ward Hill, Ma). Organic starting materials include cyclohexanol (99% Aldrich, Milwaukee, Wis.), thiophenol (97% Aldrich, Milwaukee, Wis.), 1-octanethiol (97% Acros Organic, NJ), ethyl alcohol (AAPER Alcohol and Chemical Co., KY), 2-propanol (99.9% Fisher Scientific, NJ), 1-hexanol (98% Acros organics, NJ), hexane (99.9% Fisher Scientific, NJ), phenol (99% Acros Organic, NJ), paraffin (J. T. Baker chemical Co. NJ), toluene (99.5% Mallinckordt Chemicals, NJ), naphthalene (Willert Home Products, USA), fluoranthene (93%, Acros Organic, NJ), anthracene (98% Aldrich Chemical Company, Inc. USA), and pyrene (98% Acros Organic, NJ). Mica sheets (Ted Pella, Redding, Calif.) were used as flat substrates for depositing UITAR graphene films.

For examples 25-28, the samples used for XPS, AFM, Raman, and SEM, TEM microscopy studies were produced using cyclohexanol and elemental sulfur. Prior to analysis, graphene samples were sonicated in toluene for 15 minutes to remove sulfur particles from the surface.

Potassium ferricyanide was purchased from Acros (Geel, Belgium). Hexaammineruthenium chloride was obtained from Strem chemicals Inc. (Newburyport, Mass.). Potassium chloride (99.7%), potassium nitrate (99.1%), perchloric acid, and sodium sulfate (99.7%) were obtained from Fisher Scientific (Fair Lawn, N.J.). Methylene blue and sulfuric acid (96.3%) were purchased from J. T. Baker (Phillipsburg, N.J.). All aqueous stock solutions were prepared with deionized water purified by passage through an activated carbon purification cartridge (Barnstead, model D8922, Dubuque, Iowa). Pyrolytic graphite was obtained from Emovendo magnets and elements, (Emovendo, Petersburg, W. Va.).

Scanning Electron Microscopy (SEM):

All images were produced from a Zeiss Supra 35 Scanning Electron Microscope (Carl Zeiss, Germany). The samples were produced by depositing graphene onto a Si wafer followed by cleaving with a diamond glass cutter.

X-ray Photoelectron Spectroscopy (XPS):

X-ray photoelectron spectroscopy (XPS) was performed in a vacuum chamber with a base pressure of $1 \times 10^{-10}$ Torr equipped with a Mg Kα emission line (1253 eV) and a hemispherical energy analyzer with a resolution of 0.025 eV. The samples were cleaved using cellophane tape prior to insertion into the vacuum chamber. During spectral acquisition the samples were grounded and exposed to a 500 eV electron beam to eliminate spurious charging. All spectra were acquired at room temperature.

Raman Spectroscopy:

The scanning confocal Raman microscope system was a WITec Alpha300 (WITec Instruments Corp., Ulm, Germany). The laser excitation wavelength was 532 nm and the optical magnification at the objective was 20×, producing a spot size of roughly 2.5 μm in diameter. Spectral scans were taken at 1-s integration times with 60 averaged accumulations with a pixel resolution of approximately 2.4 $cm^{-1}$ for the wide scans. Post-acquisition data processing provides better than 1 $cm^{-1}$ discrimination, or effective resolution. Various incident power settings up to roughly 25 mW were used with no instability or transient effects observed in the spectra. Multiple locations across multiple samples were analyzed.

IR Spectroscopy:

A graphene film was deposited onto a 1.2 cm Ge disk (99.999%, 4 mm thick) (Lattice Materials LLC, Bozeman, Mont.) as above. Infrared spectra were taken in transmission with 4 $cm^{-1}$ resolution and 128 scans on a Nicolet Magna-IR 760 E.S.P. (Nicolet Instrument Corp., Madison, Wis., USA) spectrometer equipped with DTGS KBr detector.

Atomic Force Microscopy:

The atomic scale structure of graphene was obtained using a Veeco di CP-II atomic force microscope (AFM) operating in contact mode in air at room temperature. The AFM was operated in low-voltage mode to minimize electronic noise with a contact force (between cantilever and sample) of approximately $10^{-9}$ N, and a 5-μm scanner was used to obtain the images. The probes were made of non-conductive silicon nitride with a cantilever spring constant of 0.01 N/m, nominally. Before observation under AFM, the graphene samples were cleaved in air for a fresh surface free of secondary contamination. The topography images were obtained in constant-height mode where the tip-to-sample spacing was not varied, as typical where molecular or atomic accuracy is desired and at a scan rate of 15 Hz; a faster scan rate reduces the effects of thermal drift resulting in better resolution.

Thermogravimetric Analysis (TGA):

Thermogravimetric analyses (TGA) was carried out in a TGA Q50 (TA instrument Inc., USA). Cyclohexanol (40 mg) and sulfur (1 mg) were used as the starting materials. All samples were placed in covered aluminum pans (TA Instruments) prior to TGA runs. A flow of N2 (99.97%, Oxarc, Spokane, Wash.) was used to displace ambient atmosphere.

Electrochemical Measurements

Figure 35:
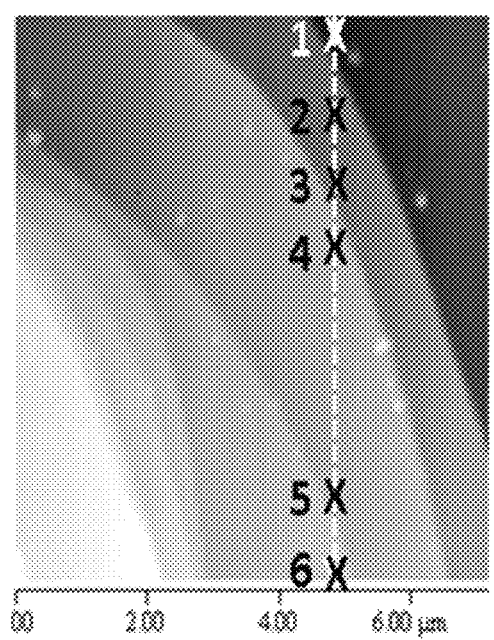
FIG. 35 is a 2-dimensional AFM image of graphene for an 8 μm×8 μm scanning area.
Figure 36:
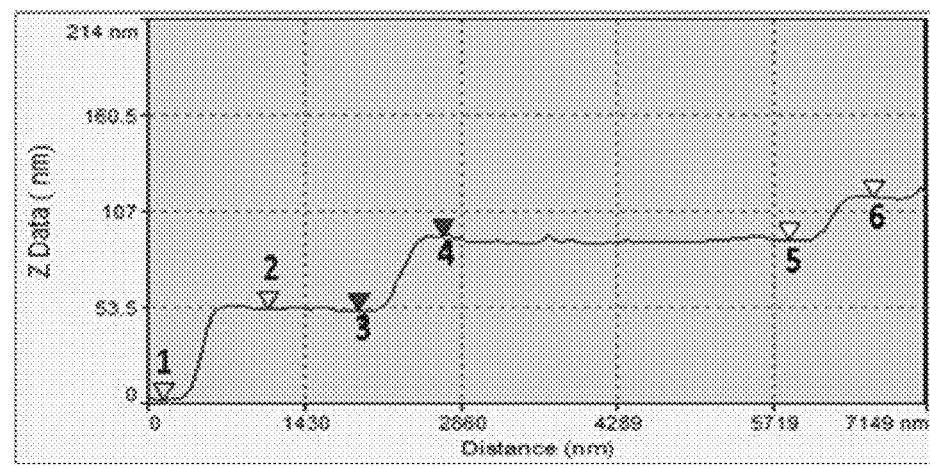
FIG. 36 is an image illustrating the height profile of a particular graphene sample.
Figure 37:
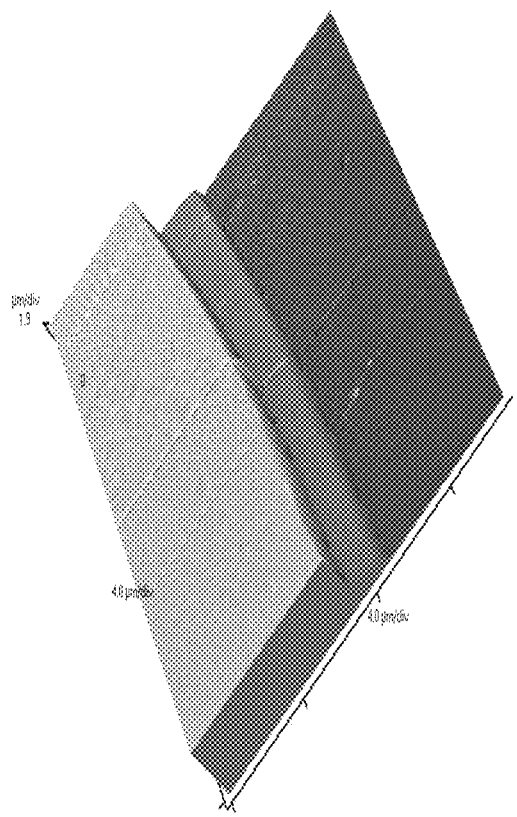
FIG. 37 is a micron scale AFM of an embodiment of the disclosed graphene material, with a corresponding height profile.
Figure 37:
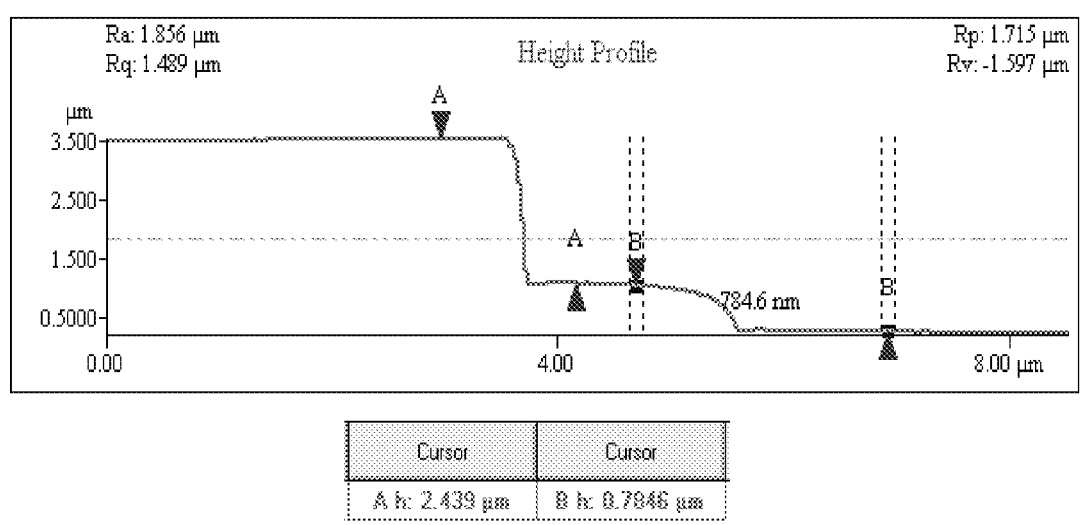

Cyclic Voltammetry and bulk electrolysis were carried out using a Bioanalytical Systems Epsilon potentiostat (West Lafayette, Ind.). Measurements were conducted using a three electrode cell consisting of GUITAR working electrode, a Ag/AgCl/3M NaCl (aq) reference electrode (0.209 V vs. SHE) and a graphite rod auxiliary electrode. The working electrode consisted of a 1 $cm^2$ GUITAR or pyrolytic graphite flake, which was manipulated onto a polystyrene sheet made from disposable petri dishes (VWR International). This flake was attached using acetone, which partially dissolved the plastic providing adhesion to GUITAR or pyrolytic graphite. The electrode assembly was dried before use. FIGS. 35 and 36 illustrate the fabrication scheme and a photograph of a GUITAR electrode.

Degradation Studies

Methylene blue degradation with 1.0 $cm^2$ GUITAR anodes was carried out at constant potential 2.0 V versus Ag/AgCl in 0.5 M $Na_2SO_4$. The solution was stirred during electrolysis. The 10 mL solution of 13 ppm of methylene blue was monitored at 663 nm with a Shimadzu Corporation (Kyoto, Japan) Pharma Spec UV-1700.

Example 1

Ace Hardware plastic roof cement, which consists primarily of asphalt but included mineral spirits, clay, cellulose, and water, was used as carbon source. The diatomites commonly used for filtering swimming pools, were also obtained from Ace Hardware. The silicon wafer was obtained from University Wafer (Boston, Mass.). It was of 111 orientation with 300 nm thermal oxide, and resistivity of 0.001-0.002 ohm-cm.

The reaction vessel was a 60 mL (70 mm) Coors casserole crucible with an inner 5 mL crucible holding the starting material. The inner crucible was filled with 5 g of asphalt precursor and placed in the larger casserole crucible. A watch glass covered the top of the apparatus. The system was heated for 12-15 minutes followed by cooling for 5-10 minutes. Various target substrates were placed on the bottom of the outer crucible, including silicon wafer fragments and diatomites. A silicon wafer acted as a flat substrate for XPS, AFM, Raman, SEM, and optical microscopy studies.

Example 2

An oil shale sample approximately 2×10 $cm^3$ was added to a casserole crucible and then heated for 20 minutes. No combustion was observed, but the production of brown smoke was observed. After cooling for 10 minutes, graphene was observed to have formed on the sides of the crucible.

Example 3

An effective amount of bitumen (with mineral spirits removed via evaporation) was added to a large crucible. The outer surface of the crucible, containing the sample, was heated for 15 minutes, followed by cooling for 10 minutes. Graphene was observed to have formed in the crucible.

Example 4

An effective amount of an asphalt/bitumen mixture was placed in a small crucible. The small crucible was then placed inside a larger crucible, the outer surface of which was heated for 12 minutes, followed by cooling for 10 minutes. Graphene was obtained, and was subsequently exfoliated to provide samples necessary for analysis.

Example 5

To a small reaction vessel was added 6.53 g of motor oil and 7.54 g of sulfur. The reaction vessel, containing the carbonaceous material and sulfur, was placed within a larger reaction vessel and heated for 5 minutes, followed by cooling for 5 minutes. Graphene was observed on the inner walls of the larger reaction vessel.

Example 6

To a small reaction vessel was added 6.53 g of motor oil and 1.06 g of sulfur. The reaction vessel, containing the carbonaceous material and sulfur, was placed within a larger reaction vessel and heated for 5 minutes, followed by cooling for 5 minutes. Graphene was observed on the inner walls of the larger reaction vessel.

Example 7

To a small reaction vessel was added 14.96 g of motor oil. The reaction vessel, containing the carbonaceous material, was placed within a larger reaction vessel and heated for 5 minutes. Flames were observed after 2.5 minutes of heating and ceased after 7 minutes of heating. The heat source was removed and the system was allowed to cool for 5 minutes. Graphene formation was observed, but not in a quantifiable amount.

Example 8

To a small reaction vessel was added 5.54 g of motor oil and 2.10 g of sulfur. The reaction vessel, containing the carbonaceous material and sulfur, was placed within a larger reaction vessel and heated for 5 minutes, followed by cooling for 5 minutes. Graphene was observed on the inner walls of the larger reaction vessel.

Example 9

To a small reaction vessel was added 5.60 g of motor oil. The reaction vessel, containing the carbonaceous material, was placed within a larger reaction vessel and heated and cooled in a manner similar to that of Example 8. Graphene was observed on the inner walls of the larger reaction vessel.

Example 10

To a small reaction vessel was added 6.0 g of paraffin and 3.5 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 11

To a small reaction vessel was added 6.0 g of paraffin and 2.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 12

To a small reaction vessel was added 6.0 g of paraffin and 0.5 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel, but not in amounts equivalent to Examples 10 and 11.

Example 13

To a small reaction vessel was added 6.0 g of motor oil and 5.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 14

To a small reaction vessel was added 6.0 g of motor oil and 2.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 15

To a small reaction vessel was added 6.0 g of motor oil and 1.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 16

To a small reaction vessel was added 6.0 g of motor oil and 0.1 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 17

To a small reaction vessel was added 6.0 g of motor oil. The reaction vessel, containing the carbonaceous material, was placed within a larger reaction vessel and heated, followed by subsequent cooling in a manner similar to that of Example 8. Graphene formation was not observed.

Example 18

To a small reaction vessel was added 6.0 g of mineral oil and 5.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 19

To a small reaction vessel was added 6.0 g of mineral oil and 2.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 20

To a small reaction vessel was added 6.0 g of mineral oil and 1.0 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 21

To a small reaction vessel was added 6.0 g of mineral oil and 0.1 g of sulfur. The reaction vessel, containing the carbonaceous material and sulfur, was placed within a larger reaction vessel and heated, followed by subsequent cooling in a manner similar to that of Example 8. Graphene was observed on the bottom of the larger reaction vessel.

Example 22

To a small reaction vessel was added 6.0 g of mineral oil. The reaction vessel, containing the carbonaceous material, was placed within a larger reaction vessel and heated, followed by subsequent cooling in a manner similar to that of Example 8. Graphene formation was not observed.

Example 23

To a small reaction vessel was added 6.0 g of cyclohexanol and 5.0 g of sulfur. The reaction vessel, containing the carbonaceous material and sulfur, was placed within a larger reaction vessel and heated, followed by subsequent cooling in a manner similar to that of Example 8. Light graphene formation was observed on the bottom of the larger reaction vessel.

Example 24

To a small reaction vessel was added 6.0 g of mineral oil. The reaction vessel, containing the carbonaceous material, was placed within a larger reaction vessel and heated, followed by subsequent cooling in a manner similar to that of Example 8. Graphene formation was not observed.

Example 25

A composition comprising cyclohexanol (20 mg) and sulfur (approx. 1 mg) was added to a thermogravimetric oven. The system was reacted under an inert atmosphere of nitrogen gas. The system was heated and cooled in a manner and for a time similar to the previous examples. Graphene formation was observed.

Example 26

Multilayer graphene was prepared with cyclohexanol and sulfur starting reagents through the disclosed method using either a flame-initiated apparatus or a thermo gravimetric apparatus (TGA). Graphene formation was observed using morphological, XPS and Raman evidence (FIGS. 26-31). The proposed mechanism of graphene formation was developed by interpreting the TGA thermogram in FIG. 25. As illustrated in FIG. 1, it is proposed that there is a reaction between sulfur and cyclohexanol, as evident in the thermogram in FIG. 25. The initial loss of mass of cyclohexanol in the presence of sulfur between room temperature and 140° C. can be attributed to evaporation; however, mass stabilizes between 140 and 240° C. Between these limits, a series of reactions are possible, which are illustrated in FIG. 1. Sulfur is known to dehydrate organics, for example, cyclohexanol to cyclohexene in Step 1, as well as dehydrogenate alkanes to olefins. Sulfur then reacts with cyclohexene forming bridging polysulfide linkages followed by degradation to a monosulfide (Steps 2-3). The faster initial loss of mass in the cyclohexanol/sulfur mixture, as opposed to the cyclohexanol-only control, can be attributed to the formation of the more volatile cyclohexene (boiling point 83° C.). Past 240° C., a sequence of dehydrogenation steps continue to 400° C. At approximately that temperature, the 1450 cm$^{-1}$ intermediate forms, where subsequent dehydrogenation produces $H_2S$ and multilayer graphene. The mass loss is nearly complete as this is a low yield reaction. Presumably the nonvolatile components rearrange to form graphene at a temperature between 400-600° C.

Example 27

In this disclosed embodiment, TGA was performed with elemental sulfur, cyclohexanol, and a mixture of the two. The reaction was carried out starting at room temperature with a temperature with a ramp of 10° C./min to a final temperature of 600° C. Pure substances boiled away completely at their expected boiling points of 161° C. (cyclohexanol) and 444.6° C. (sulfur). When each are present the thermogravimetric curve indicates a sequence of reactions. Inflection points are separated by two broad plateaus between 140-240° C. and 288-600° C. The TGA curve drops to complete mass loss at 450° C.; however, as observed in other particular disclosed embodiments, it is a very low yield reaction. A TGA run with 40 mg of toluene and 1 mg of sulfur yielded a nearly identical curve to the one in FIG. 38.

Figure 38:
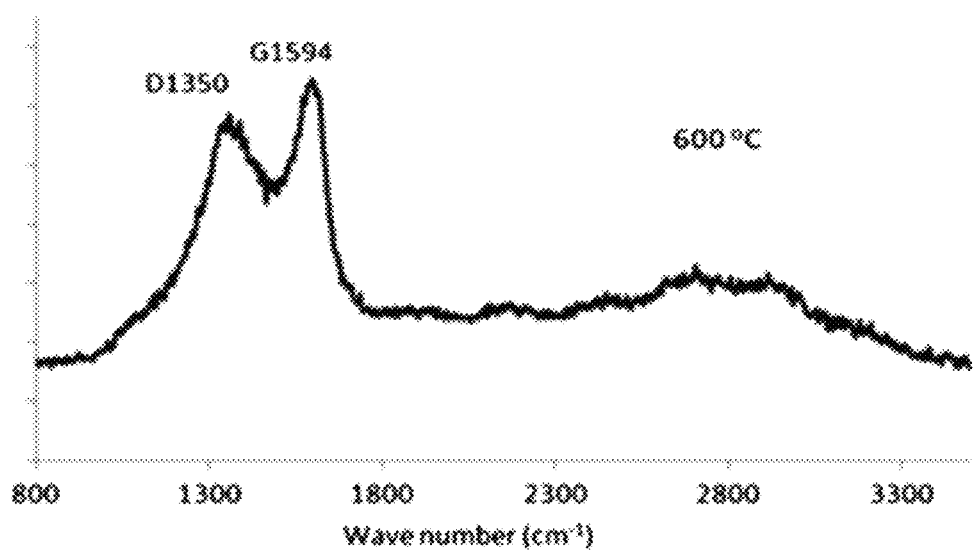
FIG. 38 is a Raman spectrum obtained from thermogravimetric analysis, illustrating the peak obtained at 600° C.

The Raman spectra of the graphene obtained from this example, as a function of the final temperature, are shown in FIG. 38. The materials obtained either through cyclohexanol/sulfur or toluene/sulfur have the characteristic G band at 1594 (cm$^{-1}$) and D band at 1350 cm$^{-1}$ for the product obtained at 600° C. The G band arises from the first order scattering of the $E_{2g}$ phonon of sp2 carbon hybridization with the D mode associated with the disordered, defects and edge carbons in graphene. The position of these bands indicate that the material lies between crystalline to nanocrystalline, sp2 carbon from the Ferrari amorphization trajectory. From FIG. 38, the I(D)/I(G) ratio is 0.97 with either starting materials. This ratio compares well with those obtained for other forms of multilayer and disordered graphenes. The Tuinstra-Koenig relationship allows for an approximation of the nano-crystal grain size based on the ratio:

$$\frac{I(D)}{I(G)} = \frac{C(\lambda)}{L_a}$$

where $C(\lambda)$ is 4.96 nm for a 532 nm excitation laser. The calculated grain size ($L_a$) is approximately 5 nm for the graphene produced from the TGA runs. This result is similar to multilayer graphene prepared by other methods.

Figure 39:
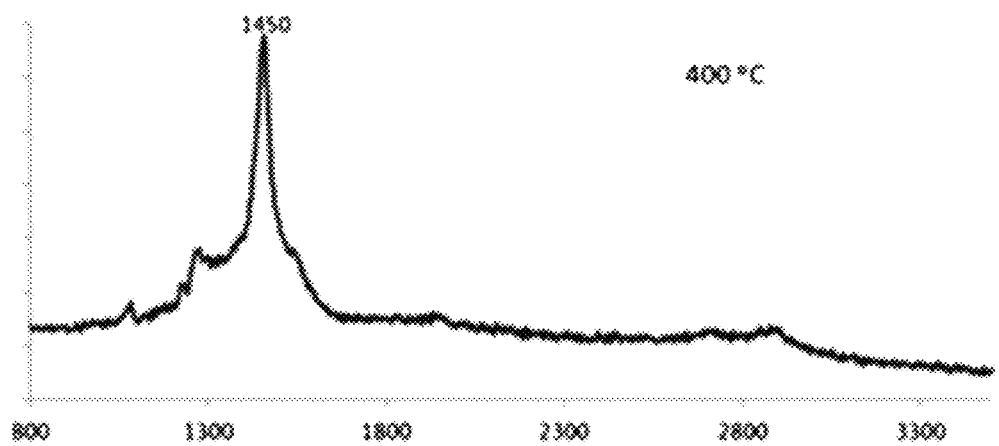
FIG. 39 is a Raman spectrum obtained from thermogravimetric analysis, illustrating the peak obtained at 400° C.
Figure 40:
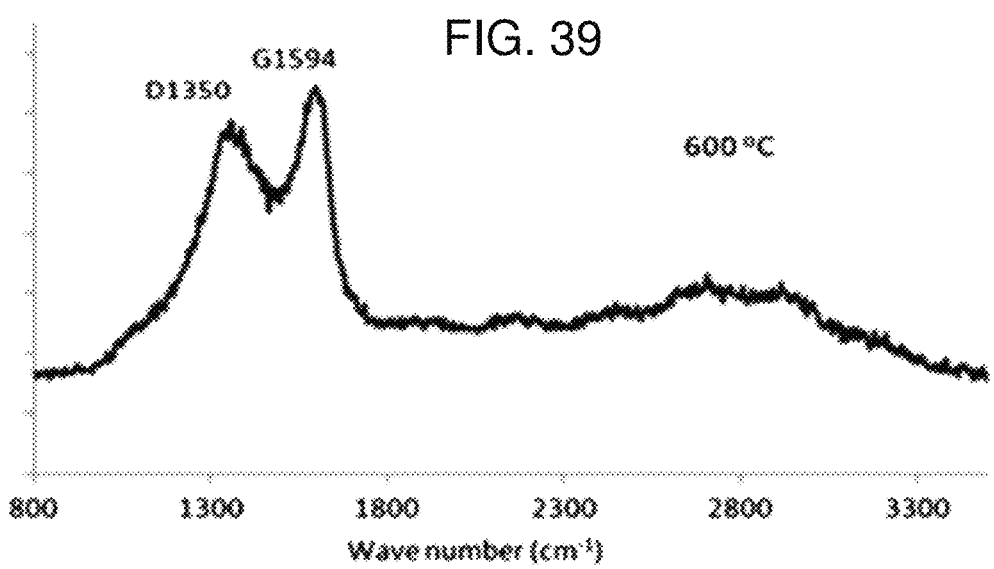
FIG. 40 is a Raman spectrum obtained from thermogravimetric analysis, illustrating the peak obtained at 550° C.

FIGS. 39 and 40 shows the Raman spectra for the cyclohexanol/sulfur mixture with a 400° C. and 550° C. terminal temperatures, respectively. For the TGA with the 400° C. final temperature an intermediate to graphene is evident by a single sharp peak at 1450 cm$^{-1}$. This band was also noted for the toluene/sulfur combinations. When the TGA terminated at 550° C. (FIG. 40), the D and G Raman bands appears, along with the intermediate band observed in FIG. 39. The 1450 cm$^{-1}$ intermediate is not evident in FIG. 38, thus, without being limited to a single theory of operation, it is currently believed that the minimum temperature for graphene formation about 600° C.

Example 28

The results from several disclosed embodiments are summarized in Table 7. Table 7 provides results for the qualitative visual observation of graphene formation using several disclosed starting materials.

TABLE 7

Qualitative visual observations for graphene formation with various starting materials

| Starting carbonaceous material all 6.0 [g] | Added Sulfur [g] | Melting Point [° C.] | Boiling Point of Organic Precursor [° C.] | Observed formation of graphene films |
|---|---|---|---|---|
| Hexane | 5.0 | −95 | 69 | ++ |
| Ethanol | 5.0 | −114 | 78 | − |
| 2-Propanol | 5.0 | −89 | 82.5 | − |
| 1-Hexanol | 5.0 | 26 | 158 | ++ |
| Cyclohexanol | 5.0 | 26 | 161 | +++ |
| Cyclohexanol | 1.0 | 26 | 161 | + |
| Cyclohexanol | 0.0 | 26 | 161 | − |
| Thiophenol | 0.0 | −15 | 169 | ++ |
| Phenol | 5.0 | 40.5 | 181.7 | ++ |
| 1-Octanethiol | 0.0 | −49 | 199 | ++ |
| Toluene | 5.0 | −93 | 110 | + |
| Naphthalene | 5.0 | 80.3 | 218 | ++ |
| Paraffin | 5.0 | 45-58 | >300 | ++ |
| Anthracene | 5.0 | 218 | 340 | − |
| Fluoranthene | 5.0 | 110 | 375 | − |
| Pyrene | 5.0 | 145-148 | 404 | − |

Example 29

Figure 47:
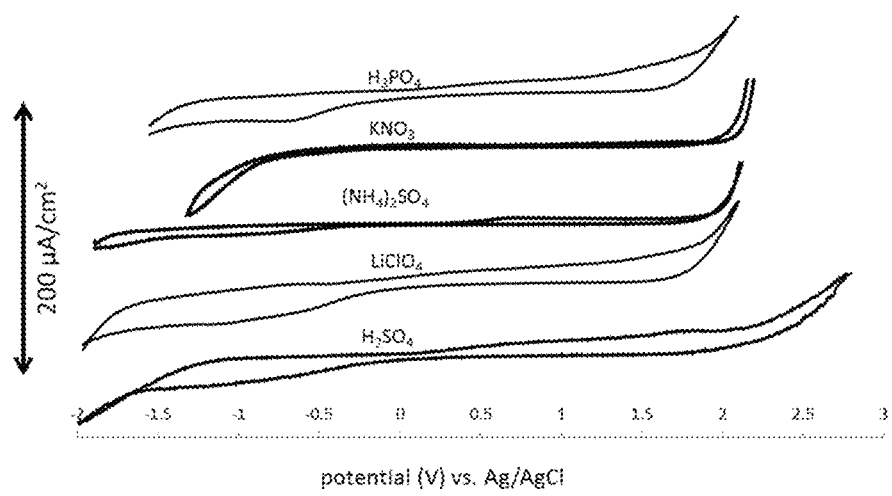
FIG. 47 is a graph of current (μA/cm$^2$) versus potential (V vs. Ag/AgCl) and illustrates cyclic voltammograms of an embodiment of the graphene anode disclosed herein operated at 100 mV/s in various electrolytes at a concentration of 1 M.

The electrochemical window of the graphene anode was determined with cyclic voltammetric measurements using an electrolyte (e.g., $H_2SO_4$, $H_3PO_4$, $KNO_3$, $(NH_4)_2SO_4$, and $LiClO_4$) and a counter electrode (a graphite rod) and a reference electrode (an Ag/AgCl electrode). The potentials were extrapolated from a current density of 200 $\mu A/cm^2$ on the graphene anode. Results from particular embodiments are illustrated in FIG. 47 and also are summarized in Table 3 (provided herein).

Example 30

The cyclic voltammetric response of an embodiment of the disclosed graphene anode was determined using the cathodic and anodic waves of 1 mM $Fe(CN)_6^{3-/4-}$ and 1 mM $Ru(NH_3)_6^{3+/2+}$. The cathodic and anodic potential peak separation ($\Delta E_p$) for this embodiment of the graphene anode was determined to be 71 mV for $Ru(NH_3)_6^{3+/2+}$ and 80 mV for $Fe(CN)_6^{3-/4-}$. Peak currents varied in a linear fashion with $v^{1/2}$ from 10 to 150 mV s$^{-1}$ indicating that both redox couples are diffusing species.

Example 31

The anodic stability of an embodiment of the disclosed graphene anode was determined using an Ag/AgCl reference electrode in 1 M $H_2SO_4$, 0.1 M $HClO_4$, 1 M $KNO_3$, and 1 M $Na_2SO_4$. The particular values obtained are provided below in Table 8, along with values reported in the literature for other types of carbon-based electrodes (for comparison purposes). Significant current was not observed until 2.5 V vs. Ag/AgCl (2.7 V vs. SHE) was applied indicating 2.5 V and 1.5 V overpotentials for Equations 3 and 4, respectively. At 200 $\mu A$ cm$^{-2}$, the disclosed graphene anode exhibits stability greater than boron doped diamond electrodes (see Table 8, provided below), which are widely used and have been reported as the most anodically stable electrodes in $H_2SO_4$. In comparison with boron doped diamond anodes, anodes comprising the disclosed graphene material surpass these electrodes by 200 mV in $H_2SO_4$ and $HClO_4$ media.

TABLE 8

Anodic limits comparison of the disclosed graphene anode to boron doped diamond and HOPG in various electrolytes.

| Electrode | Electrolyte | Anodic Limits vs. SHE (V) | Current density ($\mu A/cm^2$) |
|---|---|---|---|
| Disclosed Graphene anode | 1M $H_2SO_4$ | 2.7 | 200 |
| Boron doped diamond | | 1.9-2.5 | 200 |
| HOPG | | 1.7-2.04 | 200* |
| Disclosed Graphene anode | 0.1M $HClO_4$ | 2.4 | 200 |
| Boron doped diamond | | 2.2 | 200 |
| Disclosed Graphene anode | 1M $KNO_3$ | 2.5 | 200 |
| HOPG | | 2.04 | 200* |
| Disclosed Graphene anode | 1M $Na_2SO_4$ | 2.5 | 200 |
| N-doped diamond-like carbon | 0.5M $H_2SO_4$ | 2.6 | 200 |

*Current density estimated from an average of 0.1 cm$^2$.

Table 8 also summarizes the current density observed for an embodiment of the disclosed graphene anode. This table also provides values reported in the literature for boron doped diamond and HOPG.

Example 32

Figure 54:
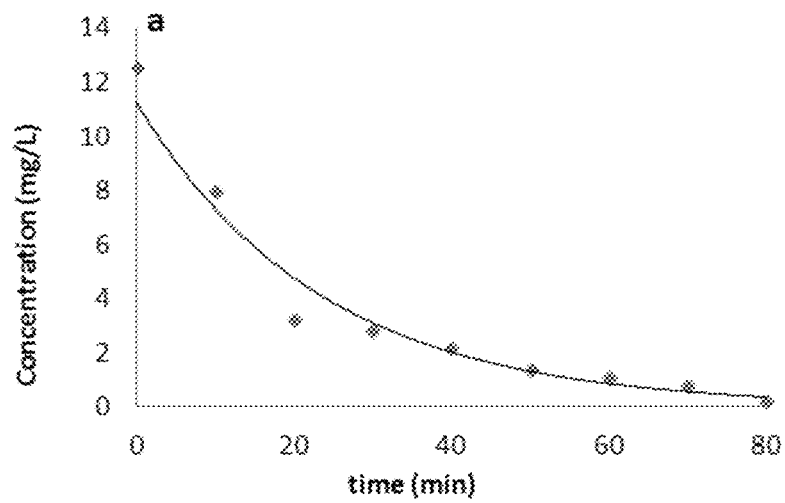
FIG. 54 is a graph of concentration (mg/L) versus time (minutes) illustrating a degradation curve of methylene blue using a 1.2 cm$^2$ graphene anode as disclosed herein.
Figure 55:
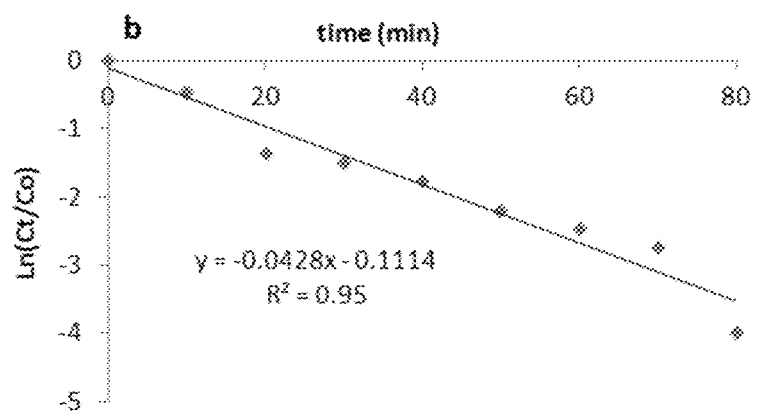
FIG. 55 is pseudo-first order decay graph obtained from the degradation curve illustrated in FIG. 54.

The ability of an embodiment of the disclosed graphene anode to degrade methylene blue was determined. A 1.2 cm$^2$ flat anode comprising a layer of the graphene material disclosed herein at 2.0V vs. Ag/AgCl effectively degraded a 13 ppm solution (0.5 M $Na_2SO_4$) to near completion within 80 min (FIG. 54). FIG. 55 illustrates that the decay curve follows pseudo-first order kinetics with a rate constant of 3.5×10$^{-2}$±0.2×10$^{-2}$ cm$^{-2}$ min$^{-1}$, (n=3). This result is superior to that obtained from a boron doped diamond anode system with a pseudo-first rate constant of 1.045×10$^{-2}$ cm$^{-2}$ min$^{-1}$ (when normalized to the 5 cm$^2$ electrode area reported in the literature, this constant is 2.09×10$^{-2}$ cm$^{-2}$ min$^{-1}$).

Example 33

Figure 56:
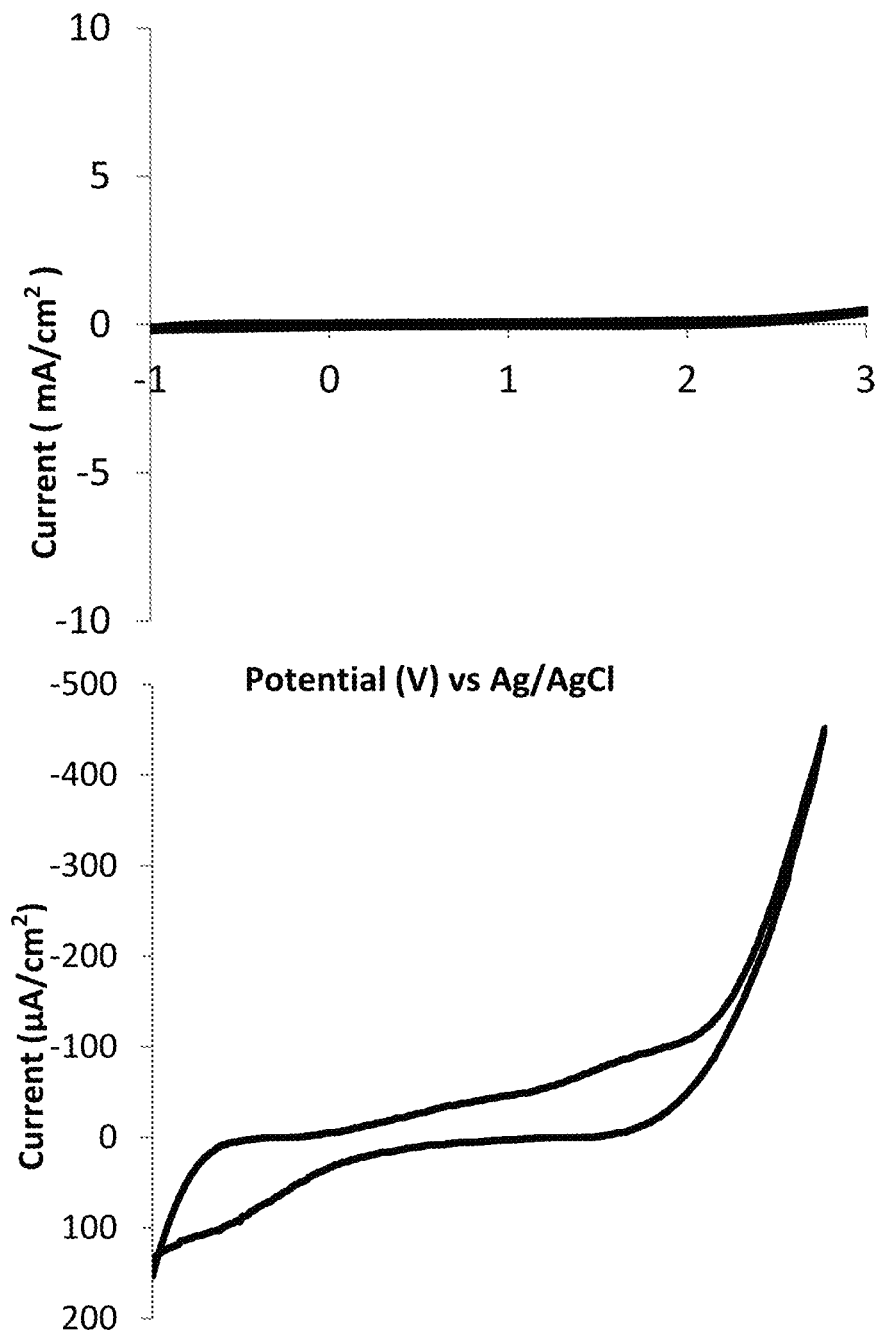
FIG. 56 is a graph of current (mA/cm$^2$) vs. potential (V vs. Ag/AgCl) illustrating a cyclic voltammogram of an embodiment of the disclosed graphene anode in 1M $H_2SO_4$ at 50 mV/seconds.
Figure 57:
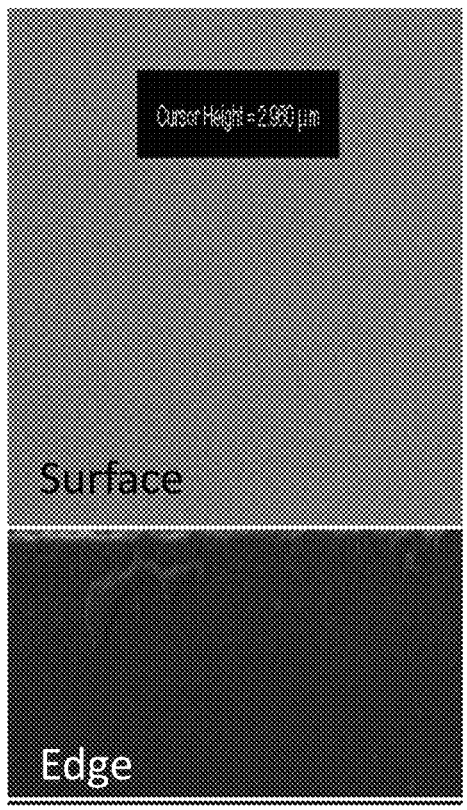
FIG. 57 is an image of an embodiment of the disclosed graphene material before a stress test used to assess the material's corrosion resistance.
Figure 58:
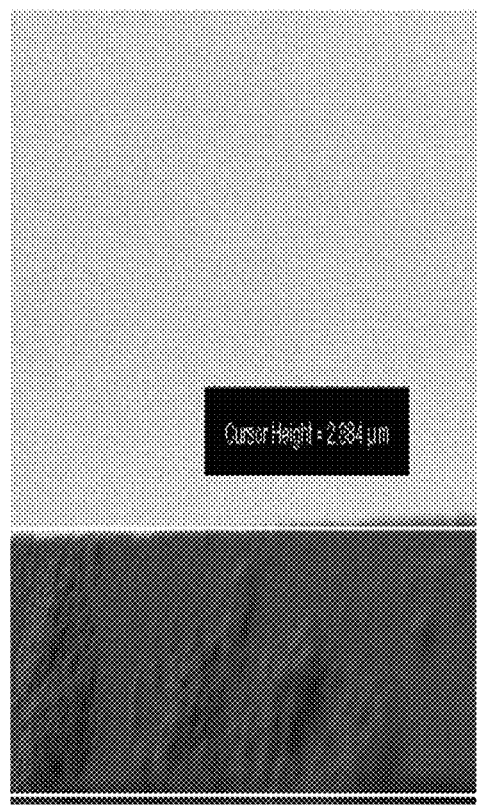
FIG. 58 is an image of the embodiment of FIG. 57 after the stress test was finished.
Figure 59:
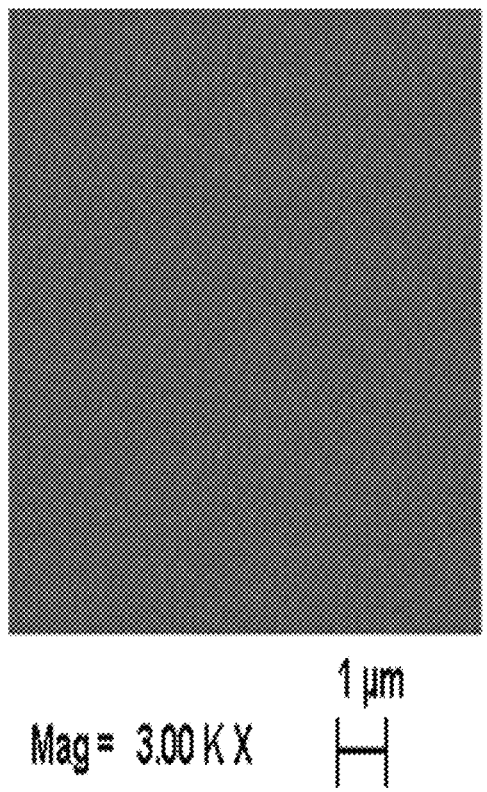
FIG. 59 is an image of a graphene material sample obtained using an embodiment of the disclosed method before a pitting corrosion stress test.
Figure 60:
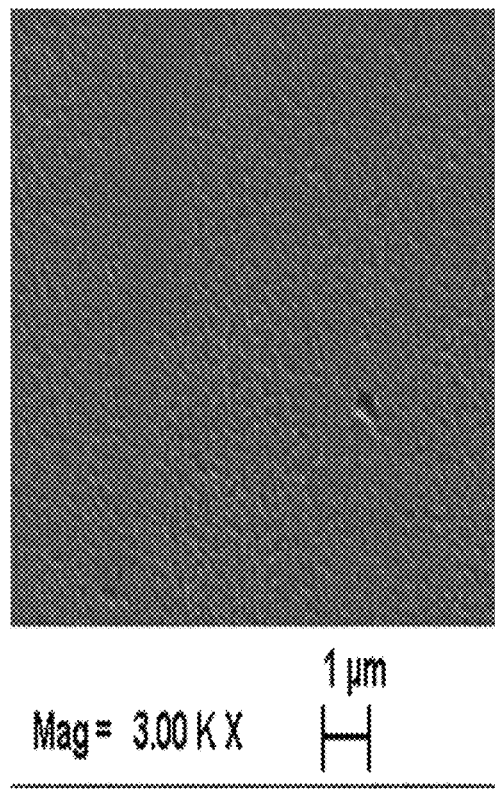
FIG. 60 is an image of the graphene material sample of FIG. 59 after a five hour pitting corrosion stress test conducted at 0.9 mA/cm$^2$.
Figure 61:
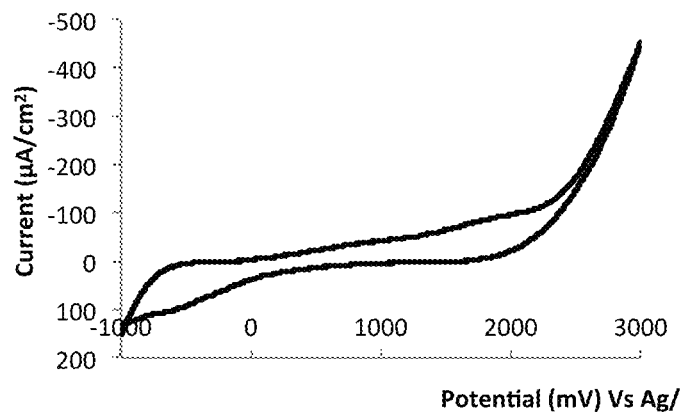
FIG. 61 is a cyclic voltammogram obtained from an embodiment of the disclosed graphene anode after being subjected to a four day constant potential stress test.

In some embodiments, the stability of the disclosed graphene anode was demonstrated using stress tests. In one embodiment, a graphene anode was subjected to a stress test using 0.88 mA/cm$^2$ for five hours in 1 M $H_2SO_4$ (see FIG. 56). The thickness of the graphene material of the anode was measured using SEM. Before the stress test was initiated, the graphene material had a thickness of about 2.96 μm (FIG. 57); this value was reduced only to 2.88 μm after the stress test was finished (FIG. 58). Pitting corrosion also was measured. In particular embodiments, there was only a slight indication of pitting corrosion after 5 hours at 0.9 mA/cm$^2$ using an embodiment of the disclosed graphene anode (comparing FIGS. 59 and 60). A constant potential stress test also was conducted which indicated that the surface of the graphene anode remained intact and that methylene blue degradation before and after the stress test was unaffected. This test utilized 2.5 V Ag/Ag/Cl in 1 M $H_2SO_4$ for four days (FIG. 61).

Example 34

Figure 62:
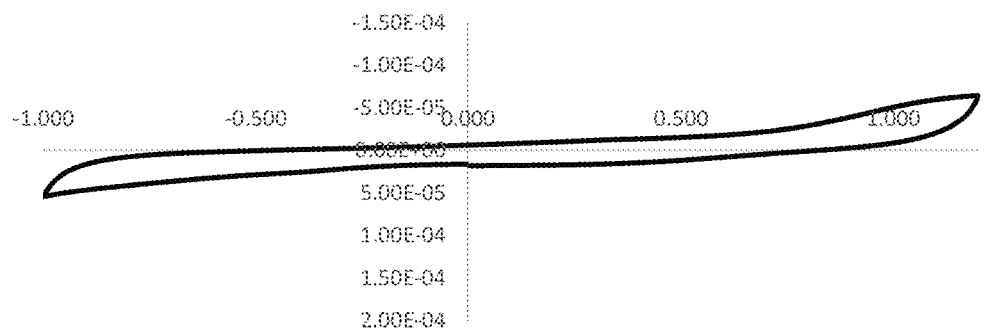
FIG. 62 is a cyclic voltammogram exhibiting the capacitance characteristics of an embodiment of the disclosed graphene electrode.
Figure 63:
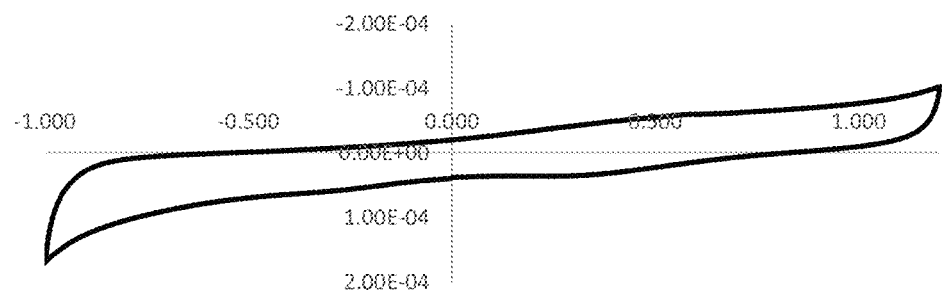
FIG. 63 is a cyclic voltammogram exhibiting the capacitance characteristics of an embodiment of the disclosed graphene electrode that has been anodized.

In one embodiment, a flat (0.08 cm$^2$) graphene electrode comprising the graphene material disclosed herein was scanned between 1.2 to −1.0 volts in 1 M H$_2$SO$_4$(aq) and exhibited only capacitive behavior (FIG. 62). A pseudo-capacitive peak at about −0.3 V was obtained which can contribute to overall performance. The total aqueous window in this embodiment was 2.2 volts for the disclosed graphene electrode. The graphene electrode exhibited a capacitance of about 298.1 μF/cm$^2$. FIG. 63 exhibits a voltammogram obtained from an anodized graphene electrode embodiment. The capacitance observed for this embodiment was 671 μF/cm$^2$.

In view of the many possible embodiments to which the principles of the disclosed invention may be applied, it should be recognized that the disclosed embodiments only exemplify the invention and should not be taken as limiting the scope of the invention. Rather, the scope of the invention is defined by the following claims. We therefore claim as our invention all that comes within the scope and spirit of these claims.

We claim:

1. An electrochemical device component comprising a carbon-based material layer having a substantially micro-crystalline grain size ranging from about 2 nm to about 15 nm, basal planes that are substantially planar, and a total electrochemical window of from at least about 3 V to about 5 V; wherein the carbon-based material layer provides a capacitance ranging from at least 200 μF/cm$^2$ to about 700 μF/cm$^2$.

2. The electrochemical device component of claim 1, wherein the electrochemical device component is a positively charged electrode or a negatively charged electrode.

3. The electrochemical device component of claim 2, wherein the carbon-based material layer is coupled to the positively charged electrode or the negatively charged electrode by an adhesive or a component that facilitates adhesion.

4. The electrochemical device component of claim 2, wherein the positively charged electrode or the negatively charged electrode comprises a polymer onto which the carbon-based material layer is deposited or coupled.

5. The electrochemical device component of claim 4, wherein the polymer is selected from polystyrene, polypropylene, polyvinyl chloride, polyethylene, or combinations thereof.

6. The electrochemical device component of claim 1, wherein the electrochemical device component is an anode.

7. The electrochemical device component of claim 1, wherein the electrochemical device component is a cathode.

8. The electrochemical device component of claim 1, wherein the electrochemical device component comprises a solid substrate coupled to the carbon-based material layer.

9. The electrochemical device component of claim 1, wherein the substantially micro-crystalline grain size is about 5 nm.

10. The electrochemical device component of claim 1, wherein the electrochemical device component is an electrochemical sensor device.

11. The electrochemical device component of claim 1, wherein the carbon-based material layer is coupled to a nanomaterial.

12. The electrochemical device component of claim 11, wherein the nanomaterial comprises nanosprings.

13. (Withdrawn - Currently Amended) A method of making the electrochemical device component of claim 1, comprising:
   providing a substrate; and
   depositing the carbon-based material layer on the substrate.

14. The method of claim 13, wherein depositing the carbon-based material layer on the substrate comprises manually depositing the carbon-based material layer on the substrate.

15. The method of claim 13, wherein depositing the carbon-based material layer on the substrate comprising depositing the carbon-based material layer on the substrate in situ.

16. A method of using the electrochemical device component of claim 1, comprising:
   exposing an organic contaminant to the electrochemical device component.

17. The method of claim 16, wherein the method further comprises measuring the amount of degradation of the organic contaminant.

18. The method of claim 16, wherein the organic contaminant is selected from carbon dioxide, formic acids, carbonic acids, oxalates, or combinations thereof.

19. An electrode, comprising:
   a carbon-based material layer having a substantially micro-crystalline grain size ranging from about 2 nm to about 15 nm, basal planes that are substantially planar, and a total electrochemical window of from at least about 3 V to about 5 V; and
   a polymer selected from polystyrene, polypropylene, polyvinyl chloride, polyethylene, or combinations thereof, wherein the carbon-based material layer is deposited or coupled on the polymer.

20. An electrochemical device component comprising a carbon-based material layer coupled to a nanomaterial comprising nanosprings, wherein the carbon-based material layer has a substantially micro-crystalline grain size ranging from about 2 nm to about 15 nm, basal planes that are substantially planar, and a total electrochemical window of from at least about 3 V to about 5 V.

* * * * *